(12) United States Patent
Yoshimura et al.

(10) Patent No.: US 10,639,740 B2
(45) Date of Patent: May 5, 2020

(54) THREE-DIMENSIONAL DEPOSITION DEVICE AND THREE-DIMENSIONAL DEPOSITION METHOD

(71) Applicant: MITSUBISHI HEAVY INDUSTRIES, LTD., Tokyo (JP)

(72) Inventors: Hitoshi Yoshimura, Tokyo (JP); Yoshiharu Ozawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 601 days.

(21) Appl. No.: 15/300,015

(22) PCT Filed: Mar. 20, 2015

(86) PCT No.: PCT/JP2015/058497
§ 371 (c)(1),
(2) Date: Sep. 28, 2016

(87) PCT Pub. No.: WO2015/151865
PCT Pub. Date: Oct. 8, 2015

(65) Prior Publication Data
US 2017/0144248 A1 May 25, 2017

(30) Foreign Application Priority Data
Mar. 31, 2014 (JP) .................. 2014-074059

(51) Int. Cl.
*B23K 26/342* (2014.01)
*B33Y 30/00* (2015.01)
(Continued)

(52) U.S. Cl.
CPC ........ *B23K 26/0093* (2013.01); *B22F 3/1055* (2013.01); *B23K 26/034* (2013.01);
(Continued)

(58) Field of Classification Search
None
See application file for complete search history.

(56) References Cited

U.S. PATENT DOCUMENTS 5,477,026 A 12/1995 Buongiorno
5,837,960 A * 11/1998 Lewis .................. B23K 26/34
219/121.63

(Continued)

FOREIGN PATENT DOCUMENTS

CN 101342640 A 1/2009
CN 101642810 A 2/2010
(Continued)

OTHER PUBLICATIONS

Japanese Notification of Reasons for Refusal and English translation, dated Oct. 17, 2017, for Japanese Application No. 2014-074059.
(Continued)

*Primary Examiner* — Geoffrey S Evans
(74) *Attorney, Agent, or Firm* — Birch, Stewart, Kolasch & Birch, LLP

(57) ABSTRACT

A three-dimensional deposition device and a three-dimensional deposition method used to manufacture a three-dimensional object with high accuracy are provided. A three-dimensional deposition device for forming a three-dimensional shape by depositing a formed layer on a base unit, includes: a powder supply unit which supplies a powder material by injecting the powder material toward the base unit; a light irradiation unit which irradiates the powder material feeding from the powder supply unit toward the base unit with a light beam so that the powder material is melted and the melted powder material is solidified on the
(Continued)

base unit to thereby form the formed layer; and a control device which controls operations of the powder supply unit and the light irradiation unit.

40 Claims, 31 Drawing Sheets

(51) Int. Cl.
*B23K 26/00* (2014.01)
*B23K 26/03* (2006.01)
*B33Y 50/02* (2015.01)
*B22F 3/105* (2006.01)
*B23K 26/046* (2014.01)
*B23K 26/144* (2014.01)
*B23K 26/064* (2014.01)
*B23K 26/14* (2014.01)
*B29C 64/153* (2017.01)
*B23K 26/04* (2014.01)
*B23K 26/06* (2014.01)
*B33Y 10/00* (2015.01)

(52) U.S. Cl.
CPC .......... *B23K 26/04* (2013.01); *B23K 26/046* (2013.01); *B23K 26/064* (2015.10); *B23K 26/0626* (2013.01); *B23K 26/14* (2013.01); *B23K 26/144* (2015.10); *B23K 26/1476* (2013.01); *B23K 26/342* (2015.10); *B29C 64/153* (2017.08); *B33Y 30/00* (2014.12); *B33Y 50/02* (2014.12); *B22F 2003/1056* (2013.01); *B22F 2003/1059* (2013.01); *B22F 2203/03* (2013.01); *B22F 2203/11* (2013.01); *B22F 2207/01* (2013.01); *B22F 2999/00* (2013.01); *B33Y 10/00* (2014.12); *Y02P 10/295* (2015.11)

(56) References Cited

U.S. PATENT DOCUMENTS

| | | | |
|---|---|---|---|
| 6,046,426 A * | 4/2000 | Jeantette | B01F 13/0255 219/121.63 |
| 6,122,564 A | 9/2000 | Koch et al. | |
| 6,401,001 B1 | 6/2002 | Jang et al. | |
| 7,020,539 B1 | 3/2006 | Kovacevic et al. | |
| 2001/0002287 A1 | 5/2001 | Kar et al. | |
| 2004/0026807 A1 | 2/2004 | Andersson et al. | |
| 2004/0133298 A1 * | 7/2004 | Toyserkani | B23K 26/032 700/166 |
| 2007/0193981 A1 | 8/2007 | Peng et al. | |
| 2009/0280269 A1 * | 11/2009 | Bewlay | B22F 5/009 427/596 |
| 2010/0031882 A1 | 2/2010 | Abe et al. | |
| 2010/0161102 A1 | 6/2010 | Mattes et al. | |
| 2011/0061591 A1 | 3/2011 | Stecker | |
| 2011/0248001 A1 * | 10/2011 | Kawanaka | C30B 11/00 219/76.1 |
| 2012/0145683 A1 | 6/2012 | Miyagi et al. | |
| 2013/0255572 A1 | 10/2013 | Nettesheim et al. | |
| 2014/0015172 A1 | 1/2014 | Sidhu et al. | |
| 2014/0079891 A1 | 3/2014 | Muramatsu et al. | |
| 2014/0186549 A1 * | 7/2014 | Miyagi | B05B 1/24 427/554 |
| 2015/0298258 A1 * | 10/2015 | Arjakine | B05B 7/228 219/76.1 |
| 2015/0321256 A1 | 11/2015 | Abe et al. | |
| 2016/0236279 A1 * | 8/2016 | Ashton | B22F 3/1055 |
| 2017/0144248 A1 | 5/2017 | Yoshimura et al. | |

FOREIGN PATENT DOCUMENTS

| | | |
|---|---|---|
| EP | 2 463 052 A1 | 6/2012 |
| EP | 3 127 685 A1 | 2/2017 |
| JP | 62-129165 A | 6/1987 |
| JP | 3-68721 A | 3/1991 |
| JP | 6-83177 U | 11/1994 |
| JP | 10-501463 A | 2/1998 |
| JP | 10-141132 A | 5/1998 |
| JP | 11-333584 A | 12/1999 |
| JP | 2003-19589 A | 1/2003 |
| JP | 2003-531034 A | 10/2003 |
| JP | 2004-82556 A | 3/2004 |
| JP | 2004-122490 A | 4/2004 |
| JP | 3943315 B2 | 7/2007 |
| JP | 2007-222869 A | 9/2007 |
| JP | 2007-301980 A | 11/2007 |
| JP | 2008-183614 A | 8/2008 |
| JP | 2009-1900 A | 1/2009 |
| JP | 2010-37599 A | 2/2010 |
| JP | 2010-207874 A | 9/2010 |
| JP | 2012-125772 A | 7/2012 |
| JP | 2012-200752 A | 10/2012 |
| KR | 10-2007-0119983 A | 12/2007 |
| WO | WO 01/85386 A2 | 11/2001 |
| WO | WO 2015/151865 A1 | 10/2015 |

OTHER PUBLICATIONS

International Search Report, issued in PCT/JP2015/058497, PCT/ISA/210, dated Jun. 16, 2015.
Written Opinion of the International Searching Authority, issued in PCT/JP2015/058497, PCT/ISA/210, dated Jun. 16, 2015.
Extended European Search Report dated Jul. 7, 2017 in corresponding European Patent Application No. 15773538.2.
Office Action dated Jun. 14, 2017 in corresponding Chinese Patent Application No. 201580017068.3 with an English Translation.
Office Action dated Mar. 16, 2017 in corresponding Taiwanese Patent Application No. 104110109 with an English Translation.
Office Action dated Jan. 26, 2018 in corresponding Chinese Application No. 201580017068.3 with an English Translation.
Partial Supplementary European Search Report dated Feb. 24, 2017 in corresponding EP Patent Application No. 15773538.2.
English translation of the Written Opinion of the International Searching Authority (Form PCT/ISA/237) for International Application No. PCT/JP2015/058497, dated Jun. 16, 2015.
Brazilian Office Action dated Dec. 18, 2019, for corresponding Brazilian Patent Application No. 112016021764-0, with English translation.
Indian Office Action for Indian Application No. 201647033206, dated Jul. 29, 2019, with an English translation.

* cited by examiner

THREE-DIMENSIONAL DEPOSITION DEVICE AND THREE-DIMENSIONAL DEPOSITION METHOD

FIELD

The present invention relates to a three-dimensional deposition device and a three-dimensional deposition method used to manufacture a three-dimensional object by deposition.

BACKGROUND

As a technology of manufacturing a three-dimensional object, there is known a deposition shaping technology of manufacturing a three-dimensional object by irradiating a metallic powder material with a light beam. For example, Patent Literature 1 discloses a method in which a powder layer formed of a metallic powder material is irradiated with a light beam so that a sintered layer is formed and this process is repeated so that a plurality of sintered layers are integrally deposited to thereby form a three-dimensional object. Further, Patent Literature 2 discloses a device which includes a separable conical nozzle having a center opening used to output a laser beam and powdered metal. Here, a work is irradiated with a laser as a processing target to form a thin liquefied metal reserved part and powdered metal is supplied to that position to form padding.

CITATION LIST

Patent Literature

Patent Literature 1: Japanese Laid-open Patent Publication No. 2009-1900
Patent Literature 2: Japanese Laid-open Patent Publication No. 10-501463

SUMMARY

Technical Problem

Incidentally, there has been a demand to manufacture the three-dimensional object with high accuracy in the deposition shaping technology of manufacturing the three-dimensional object.

An object of the invention is to provide a three-dimensional deposition device and a three-dimensional deposition method used to manufacture a three-dimensional object with high accuracy.

Solution to Problem

To solve the problem and achieve the object above, a three-dimensional deposition device of this invention forms a three-dimensional shape by depositing a formed layer on a base unit, includes: a powder supply unit which supplies a powder material by injecting the powder material toward the base unit; a light irradiation unit which irradiates the powder material feeding from the powder supply unit toward the base unit with a light beam so that the powder material is melted and the melted powder material is solidified on the base unit to thereby form the formed layer; and a control device which controls operations of the powder supply unit and the light irradiation unit.

It is preferable to include a powder introduction unit which includes a plurality of storage units storing the powder material supplied to the powder supply unit and switches the powder material to be introduced to the powder supply unit by switching the storage units.

It is preferable that the powder introduction unit includes three or more storage units and is able to introduce three types or more of powder materials to the powder supply unit, and when the powder material introduced to the powder supply unit is switched from a first powder material to a second powder material, the control device forms the formed layer by the first powder material, thereafter forms the formed layer by an intermediate powder material having high affinity with both the first powder material and the second powder material, and thereafter forms the formed layer by the second powder material.

It is preferable that the powder introduction unit includes two or more storage units and is able to introduce two types or more of powder materials into the powder supply unit, and when the powder material introduced to the powder supply unit is switched from a first powder material to a second powder material, the control device forms the formed layer by the first powder material, thereafter starts the supply of the second powder material to the powder supply unit while supplying the first powder material to the powder supply unit, and changes a supply ratio by increasing a supply amount of the second powder material while decreasing a supply amount of the first powder material.

It is preferable to include a machining unit which includes a tool and performs a machining operation on the formed layer by the tool.

It is preferable that the powder supply unit is concentrically disposed on an outer periphery of the light irradiation unit and is formed so that a powder passage causing the powder material to flow therethrough is formed between an inner tube surrounding a path of the light beam of the light irradiation unit and an outer tube covering the inner tube.

It is preferable to include a shield gas supply unit which is disposed on an outer periphery of the powder supply unit concentrically with the outer periphery of the light irradiation unit while surrounding an outer periphery of a powder material injection area from outside the powder passage and injecting a shield gas toward the base unit.

It is preferable to include a focal position adjustment unit which adjusts a focal position of the light beam emitted from the light irradiation unit.

It is preferable that the focal position adjustment unit is an mechanism that moves a position of the light irradiation unit.

It is preferable that the focal position adjustment unit is an mechanism that moves a focal distance or a focal position by adjusting a light concentrating optical system of the light irradiation unit.

It is preferable to include a temperature detection unit which detects a temperature of a surface of the formed layer, wherein the control device controls intensity of the light beam output from the light irradiation unit in response to a temperature measurement result of the surface of the formed layer obtained by the temperature detection unit.

It is preferable that the control device specifies a temperature detection position based on a temperature measurement result of the surface of the formed layer obtained by the temperature detection unit and properties of the base unit and the formed layer, and controls the intensity of the light beam output from the light irradiation unit based on a detection result at the specified position.

It is preferable to include a plasma emission detection unit which detects a plasma emission state of the surface of the formed layer, wherein the control device controls the intensity of the light beam output from the light irradiation unit in response to a measurement result obtained by the plasma emission detection unit.

It is preferable to include a reflected light detection unit which detects reflected light from the surface of the formed layer, wherein the control device controls the intensity of the light beam output from the light irradiation unit in response to a measurement result obtained by the reflected light detection unit.

It is preferable to include a movement mechanism which relatively moves the light irradiation unit and the powder supply unit with respect to the base unit, wherein the control device determines a path through which the light irradiation unit and the powder supply unit pass with respect to the base unit by the movement mechanism.

It is preferable to include a shape measurement unit which measures a surface shape of the formed layer, wherein the control device controls operations of the powder supply unit, the light irradiation unit, and the movement mechanism in response to a surface shape measurement result of the formed layer obtained by the shape measurement unit.

It is preferable that the light irradiation unit is able to adjust a profile of the light beam.

It is preferable that the light irradiation unit is able to switch a mode of emitting the light beam in the form of pulse waves and a mode of emitting the light beam in the form of continuous waves.

It is preferable to include a powder collection unit which collects the powder material supplied from the powder supply unit and is not melted by the light beam.

It is preferable to include a separation unit which separates the powder material collected by the powder collection unit in accordance with the property of the powder material.

It is preferable to include a powder introduction unit which includes a storage unit storing the powder material supplied to the powder supply unit and an identification unit identifying the powder material stored in the storage unit and introduces the powder material of the storage unit identified by the identification unit into the powder supply unit, wherein the control device controls the introduction of the powder material from the powder introduction unit to the powder supply unit in response to a powder material identification result of the identification unit.

Further, it is preferable that the control device control an operation of at least one of the powder supply unit and the light irradiation unit in response to a powder material identification result obtained by the powder introduction unit.

It is preferable that the control device supply different types of powder materials in a mixed state from the powder introduction unit toward the powder supply unit based on the powder material identification result of the identification unit and the instruction of supplying different types of powder materials in a mixed state from the powder supply unit.

To solve the problem and achieve the object above, a three-dimensional deposition method of this invention forms a three-dimensional object by depositing a formed layer on a base unit, includes: melting a powder material by irradiating the powder material with a light beam while injecting the powder material toward the base unit, solidifying the melted powder material on the base unit to form a formed layer on the base unit, and depositing the formed layer.

It is preferable that a position of the formed layer is detected and a focal position of the light beam is adjusted in response to the position of the formed layer.

It is preferable that a temperature of a surface of the formed layer is detected and intensity of the output light beam is controlled based on a temperature measurement result of the surface of the formed layer.

It is preferable that a plasma emission state of the surface of the formed layer is detected and the intensity of the output light beam is controlled in response to a plasma emission measurement result of the formed layer.

It is preferable that reflected light of the surface of the formed layer is detected and the intensity of the output light beam is controlled in response to a reflected light measurement result of the formed layer.

It is preferable that a mode of emitting the light beam in the form of pulse waves and a mode of emitting the light beam in the form of continuous waves are switched in response to the formed layer to be formed.

Advantageous Effects of Invention

According to the invention, it is possible to manufacture the three-dimensional object with high accuracy.

DESCRIPTION OF EMBODIMENTS

Hereinafter, preferred embodiments of the invention will be described in detail with reference to the accompanying drawings. Further, the invention is not limited to the embodiment. Then, when there are a plurality of embodiments, a combination of the embodiments may be employed.

Figure 1:
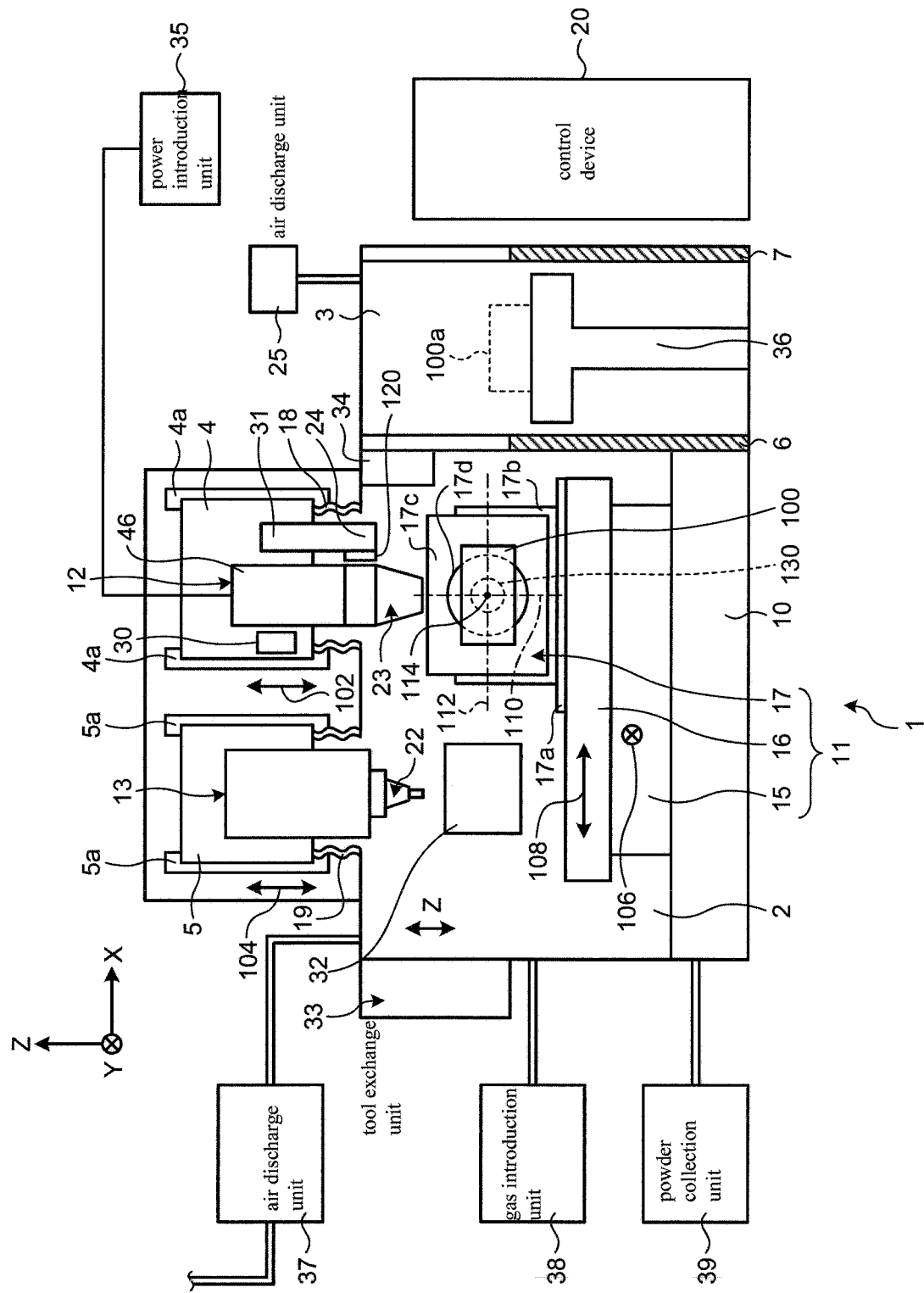
FIG. 1 is a schematic diagram illustrating a three-dimensional deposition device according to an embodiment.

FIG. 1 is a schematic diagram illustrating a three-dimensional deposition device 1 of the embodiment. Here, in the embodiment, one direction within a horizontal plane will be set as an X-axis direction, a direction orthogonal to the X-axis direction within the horizontal plane will be set as a Y-axis direction, and a direction (a vertical direction) orthogonal to each of the X-axis direction and the Y-axis direction will be set as a Z-axis direction.

The three-dimensional deposition device 1 illustrated in FIG. 1 is a device that manufactures a three-dimensional object on a base unit 100. The base unit 100 is a base member on which the three-dimensional object is formed. The base unit 100 is carried to a predetermined position of the three-dimensional deposition device 1 so that the three-dimensional object is formed on a surface thereof. The base unit 100 of the embodiment is a plate-shaped member. Further, the base unit 100 is not limited thereto. As the base unit 100, a base member of the three-dimensional object may be used or a member adding the three-dimensional object may be used. A member corresponding to a component or a product, by forming the three-dimensional object at a predetermined position, may be used as the base unit 100.

The three-dimensional deposition device 1 includes a three-dimensional deposition chamber 2, a spare chamber 3, a deposition head accommodation chamber 4, a machining unit accommodation chamber 5, a bed 10, a table unit 11, a deposition head 12, a machining unit 13, a control device 20, a heating head 31, a machining measurement unit 32, a tool exchange unit 33, a nozzle exchange unit 34, a powder introduction unit 35, an air discharge unit 37, a gas introduction unit 38, a powder collection unit 39, a temperature detection unit 120, and a weight detection unit 130.

The three-dimensional deposition chamber 2 is a casing (a chamber) in which a part other than a designed communication part such as a connection pipe is sealed from the outside. The designed communication part is provided with a valve that switches a sealed state and an opened state. If necessary, the three-dimensional deposition chamber 2 can be sealed. The three-dimensional deposition chamber 2 includes therein the bed 10, the table unit 11, the deposition head 12, a part of the machining unit 13, a part of the heating head 31, the machining measurement unit 32, the tool exchange unit 33, and the nozzle exchange unit 34.

The spare chamber 3 is provided adjacent to the three-dimensional deposition chamber 2. In the spare chamber 3, a part other than a designed communication part such as a connection pipe is sealed from the outside. The spare chamber 3 is formed as a decompression chamber that connects the outside and the three-dimensional deposition chamber 2 to each other. A base movement unit 36 is provided inside the spare chamber 3. Here, for example, an airtight door 6 is provided at the connection part with the three-dimensional deposition chamber 2 in the spare chamber 3. Further, the spare chamber 3 is connected to the outside by the airtight door 7. Further, the spare chamber 3 is provided with an air discharge unit 25 which discharges air from the spare chamber 3. When the door 7 is opened, a necessary member can be carried into the spare chamber 3 from the outside. Further, when the door 6 is opened, a member can be carried between the spare chamber 3 and the three-dimensional deposition chamber 2.

The deposition head accommodation chamber 4 is provided at an upper face of the three-dimensional deposition chamber 2 in the Z-axis direction. The deposition head accommodation chamber 4 is supported by a Z-axis slide unit 4a to be movable in the Z-axis direction (an arrow 102)

with respect to the three-dimensional deposition chamber 2. A lower face of the deposition head accommodation chamber 4 in the Z-axis direction is connected to the three-dimensional deposition chamber 2 by a bellows 18. The bellows 18 connects the lower face of the deposition head accommodation chamber 4 in the Z-axis direction to the three-dimensional deposition chamber 2 so that the lower face of the deposition head accommodation chamber 4 in the Z-axis direction is formed as a part of the three-dimensional deposition chamber 2. Further, the three-dimensional deposition chamber 2 is formed so that an opening is formed in an area surrounded by the bellows 18. A space surrounded by the bellows 18 and the lower face of the deposition head accommodation chamber 4 in the Z-axis direction is connected to the three-dimensional deposition chamber 2 and is sealed along with the three-dimensional deposition chamber 2. The deposition head accommodation chamber 4 supports the deposition head 12, a shape measurement unit 30, and the heating head 31. Further, the deposition head accommodation chamber 4 is formed so that a part including a nozzle 23 of the deposition head 12 and a part including a front end 24 of the heating head 31 protrude toward the three-dimensional deposition chamber 2 from the lower face in the Z-axis direction.

When the deposition head accommodation chamber 4 moves in the Z-axis direction by the Z-axis slide unit 4a, the deposition head 12, the shape measurement unit 30, and the heating head 31 held therein are moved in the Z-axis direction. Further, the deposition head accommodation chamber 4 is connected to the three-dimensional deposition chamber 2 through the bellows 18. The bellows 18 is deformed in accordance with the movement in the Z-axis direction and thus a sealed state between the three-dimensional deposition chamber 2 and the deposition head accommodation chamber 4 can be kept.

The machining unit accommodation chamber 5 is provided at the upper face of the three-dimensional deposition chamber 2 in the Z-axis direction. Further, the machining unit accommodation chamber 5 is disposed adjacent to the deposition head accommodation chamber 4. The machining unit accommodation chamber 5 is supported by a Z-axis slide unit 5a to be movable in the Z-axis direction (a direction of an arrow 104) with respect to the three-dimensional deposition chamber 2. A lower face of the machining unit accommodation chamber 5 in the Z-axis direction is connected to the three-dimensional deposition chamber 2 by a bellows 19. The bellows 19 connects the lower face of the machining unit accommodation chamber 5 in the Z-axis direction to the three-dimensional deposition chamber 2 so that the lower face of the machining unit accommodation chamber 5 in the Z-axis direction is formed as a part of the three-dimensional deposition chamber 2. Further, the three-dimensional deposition chamber 2 is formed so that an opening is formed in an area surrounded by the bellows 19. A space surrounded by the lower face of the machining unit accommodation chamber 5 in the Z-axis direction and the bellows 19 is connected to the three-dimensional deposition chamber 2 and is sealed along with the three-dimensional deposition chamber 2. The machining unit accommodation chamber 5 supports the machining unit 13. Further, the machining unit accommodation chamber 5 is formed so that a part including a tool 22 of the machining unit 13 protrudes toward the three-dimensional deposition chamber 2 from the lower face in the Z-axis direction.

When the machining unit accommodation chamber 5 moves in the Z-axis direction by the Z-axis slide unit 5a, the machining unit 13 held therein is moved in the Z-axis direction. Further, the machining unit accommodation chamber 5 is connected to the three-dimensional deposition chamber 2 through the bellows 19. The bellows 19 is deformed in accordance with the movement in the Z-axis direction and thus a sealed state between the three-dimensional deposition chamber 2 and the machining unit accommodation chamber 5 can be kept.

The bed 10 is provided at a bottom in the three-dimensional deposition chamber 2 in the Z-axis direction. The bed 10 supports the table unit 11. Various wirings, pipes, or driving assemblies are disposed on the bed 10.

The table unit 11 is disposed on an upper face of the bed 10 and supports the base unit 100. The table unit 11 includes a Y-axis slide unit 15, an X-axis slide unit 16, and a rotation table unit 17. The table unit 11 has the base unit 100 attached thereto and moves the base unit 100 on the bed 10.

The Y-axis slide unit 15 moves the X-axis slide unit 16 in the Y-axis direction (a direction of an arrow 106) with respect to the bed 10. The X-axis slide unit 16 is fixed to a member corresponding to a movable part of the Y-axis slide unit 15. The X-axis slide unit 16 moves the rotation table unit 17 in the X-axis direction (a direction of an arrow 108) with respect to the Y-axis slide unit 15. The rotation table unit 17 is fixed to a member corresponding to a movable part of the X-axis slide unit 16 and supports the base unit 100. The rotation table unit 17 is, for example, an inclined circular table and includes a fixing base 17a, a rotation table 17b, an inclination table 17c, and a rotation table 17d. The fixing base 17a is fixed to a member corresponding to a movable part of the X-axis slide unit 16. The rotation table 17b is supported by the fixing base 17a. The rotation table 17b rotates about a rotation shaft 110 which is a rotation axis and is parallel to the Z-axis direction. The inclination table 17c is supported by the rotation table 17b. The inclination table 17c rotates about a rotation shaft 112 which is an axis and is orthogonal to a face supporting the rotation table 17b. The rotation table 17d is supported by the inclination table 17c. The rotation table 17d rotates about a rotation shaft 114 which is an axis and is orthogonal to a surface supporting the inclination table 17c. The rotation table 17d is used to fix the base unit 100. In this way, the rotation table unit 17 can rotate the base unit 100 about three orthogonal axes by rotating the components thereof about the rotation shafts 110, 112, and 114. The table unit 11 moves the base unit 100 fixed to the rotation table unit 17 in the Y-axis direction and the X-axis direction by the Y-axis slide unit 15 and the X-axis slide unit 16. Further, the table unit 11 rotates the base unit 100 about three orthogonal axes by rotating the components thereof about the rotation shafts 110, 112, and 114 by the rotation table unit 17. The table unit 11 may further move the base unit 100 in the Z-axis direction.

The deposition head 12 injects a powder material toward the base unit 100, irradiates the powder material injected onto the base unit with a laser beam to melt the powder, and solidifies the melted powder on the base unit 100 to form a formed layer. The powder which is introduced into the deposition head 12 is powder which is used as a raw material of the three-dimensional object. In the embodiment, for example, a metal material such as iron, copper, aluminum, or titanium can be used as the powder. As the powder, a material such as ceramic other than the metal material may be used. The deposition head 12 is provided at a position facing the upper face of the bed 10 in the Z-axis direction. The deposition head 12 faces the table unit 11. A lower part of the deposition head 12 in the Z-axis direction is provided with the nozzle 23. The nozzle 23 is attached to a main body 46 of the deposition head 12.

Figure 2:
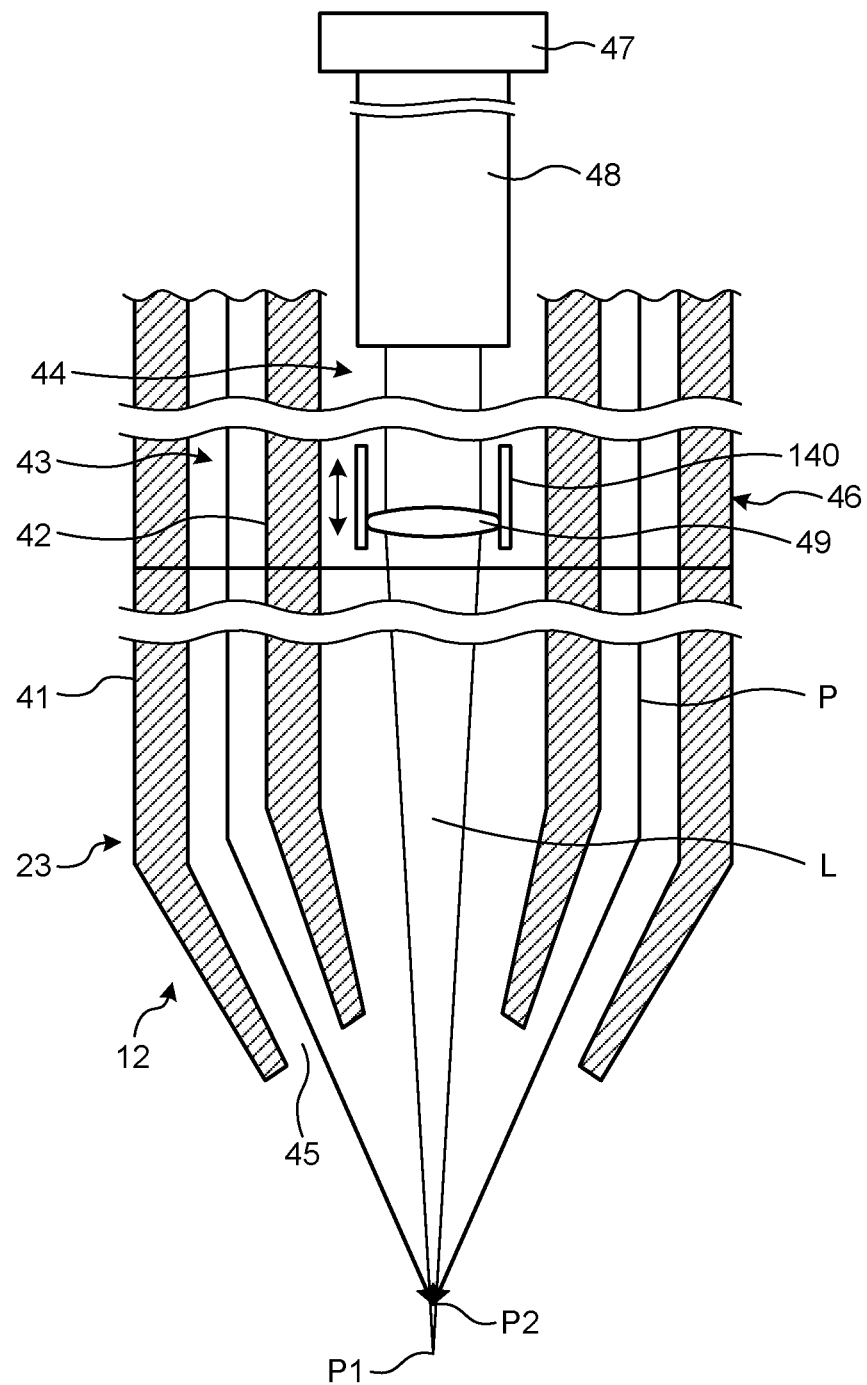
FIG. 2 is a cross-sectional view illustrating an example of a front end of a deposition head.

First, the nozzle 23 will be described with reference to FIG. 2. FIG. 2 is a cross-sectional view illustrating an example of the nozzle 23 of the deposition head 12. As illustrated in FIG. 2, the nozzle 23 is a double tube including an outer tube 41 and an inner tube 42 inserted into the outer tube 41. The outer tube 41 is a tubular member and is formed so that a diameter decreases as it goes toward a front end (the downside in the Z-axis direction). The inner tube 42 is inserted into the outer tube 41. The inner tube 42 is also a tubular member and has a shape in which a diameter decreases as it goes toward a front end (the downside in the Z-axis direction). In the nozzle 23, a gap between an inner periphery of the outer tube 41 and an outer periphery of the inner tube 42 is formed as a powder passage 43 through which a powder material (powder) P passes. An inner peripheral face side of the inner tube 42 is formed as a laser path 44 through which a laser beam passes. Here, the main body 46 to which the nozzle 23 is attached is a double tube similarly to the nozzle 23 and the powder passage 43 and the laser path 44 are formed in this way. In the deposition head 12, the powder passage 43 is disposed to surround the laser path 44. In the embodiment, the powder passage 43 is formed as a powder injection unit which injects powder. In the deposition head 12, the powder P which is introduced from the powder introduction unit 35 flows through the powder passage 43. The powder P is injected from a nozzle injection opening 45 which is an opening at an end side between the outer tube 41 and the inner tube 42.

Further, the deposition head 12 includes a light source 47, an optical fiber 48, and a light concentrating unit 49. The light source 47 outputs a laser beam L. The optical fiber 48 guides a laser beam L output from the light source 47 to the laser path 44. The light concentrating unit 49 is disposed at the laser path 44 and is disposed at the optical path of the laser beam L output from the optical fiber 48. The light concentrating unit 49 concentrates a laser beam L output from the optical fiber 48. The laser beam L which is concentrated by the light concentrating unit 49 is output from the end of the inner tube 42. In the deposition head 12, the light concentrating unit 49 is disposed at the main body 46, but a part or the entirety of the light concentrating unit 46 may be disposed at the nozzle 23. When a part or the entirety of the light concentrating unit 46 is disposed at the nozzle 23, a focal position can be changed to a different position by the replacement of the nozzle 23.

The three-dimensional deposition device 1 includes a focal position adjustment unit 140. The focal position adjustment unit 140 moves the light concentrating unit 49 in a direction in which the laser beam L travels. The focal position adjustment unit 140 can adjust a focal position of the laser beam L by moving a position of the light concentrating unit 49 in a direction in which the laser beam L travels. Additionally, a mechanism that adjusts a focal distance of the light concentrating unit 49 can be used as the focal position adjustment unit 140. Further, in the three-dimensional deposition device 1, the Z-axis slide unit 4a is also used as one of the focal position adjustment units. The Z-axis slide unit 4a moves along with a focal position P1 of the laser beam L and a position P2 (for example, a focal position of the injected powder material) to which the powder material is injected. The focal position adjustment unit 140 can also move the focal position P1 of the laser beam L to the position P2 to which the powder material is injected. The three-dimensional deposition device 1 can switch a control target in response to an adjustment target.

The deposition head 12 injects the powder P from the powder passage 43 and outputs the laser beam L from the laser path 44. The powder P injected from the deposition head 12 enters an area irradiated with the laser beam L output from the deposition head 12. The powder P is heated by the laser beam L. The powder P irradiated with the laser beam L is melted and reaches the base unit 100. The powder P which reaches the base unit 100 in a melted state is cooled and solidified. Accordingly, a formed layer is formed on the base unit 100.

Here, the deposition head 12 of the embodiment guides the laser beam L output from the light source 47 by the optical fiber 48, but an optical member other than the optical fiber may be used to guide the laser beam. Further, the light concentrating unit 49 may be provided at one of or both the main body 46 and the nozzle 23. Since the deposition head 12 of the embodiment can be processed effectively, the powder passage 43 ejecting the powder P and the laser path 44 irradiated with the laser beam L are provided coaxially. However, the deposition head 12 is not limited thereto. The deposition head 12 may be formed so that an assembly for injecting the powder P and an assembly for emitting the laser beam L are provided as separate members. The deposition head 12 of the embodiment irradiates a powder material with a laser beam, but may emit a light beam other than the laser beam as long as the powder material can be melted or sintered.

Figure 3:
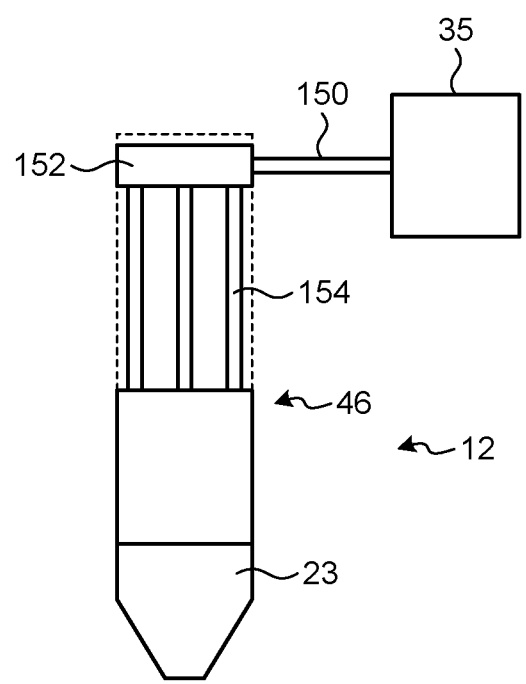
FIG. 3 is a schematic diagram illustrating a schematic configuration of a structure that supplies a powder material to the deposition head.
Figure 4:
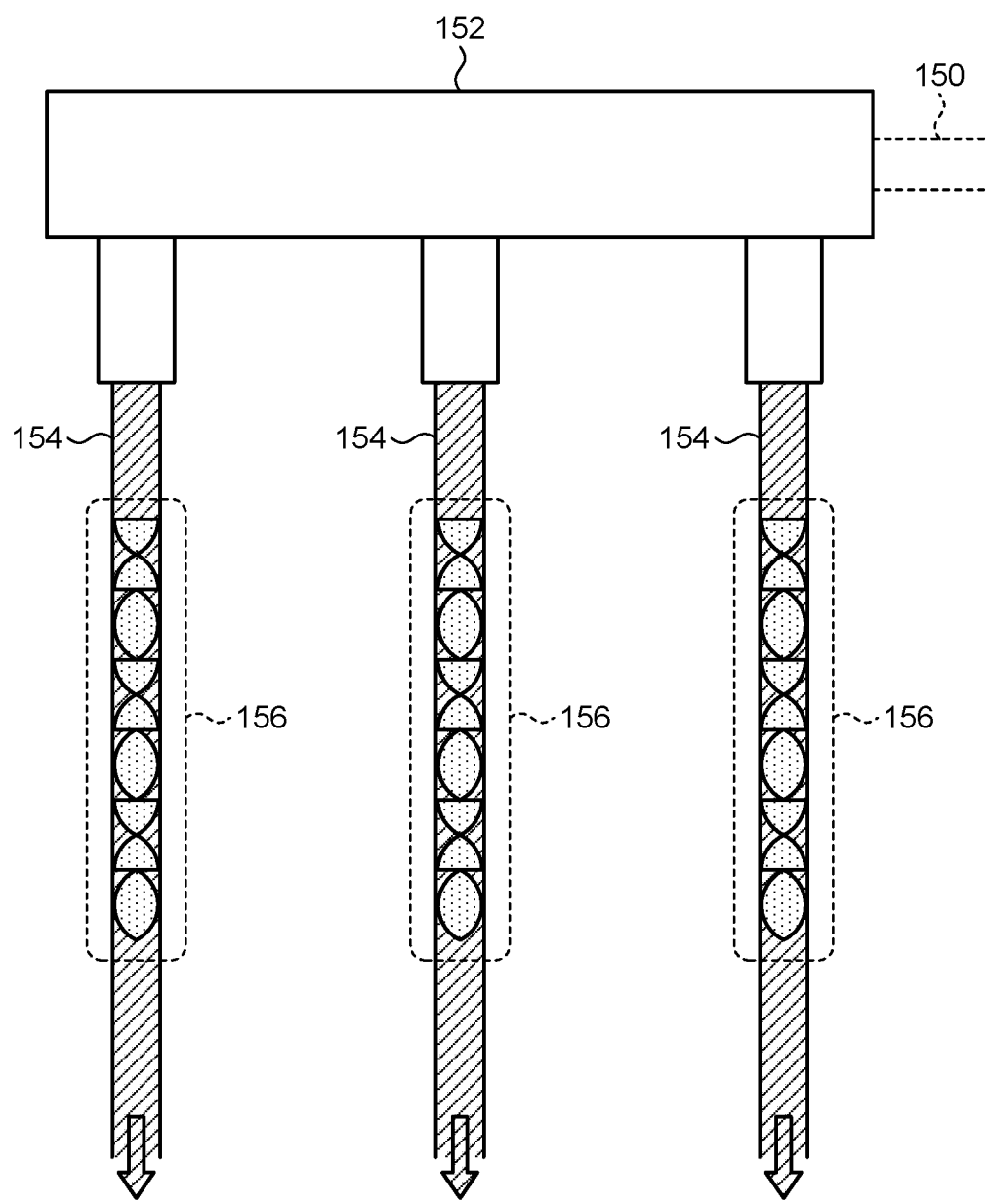
FIG. 4 is a development view illustrating schematic configurations of a branch tube and a distribution unit of the deposition head.
Figure 5:
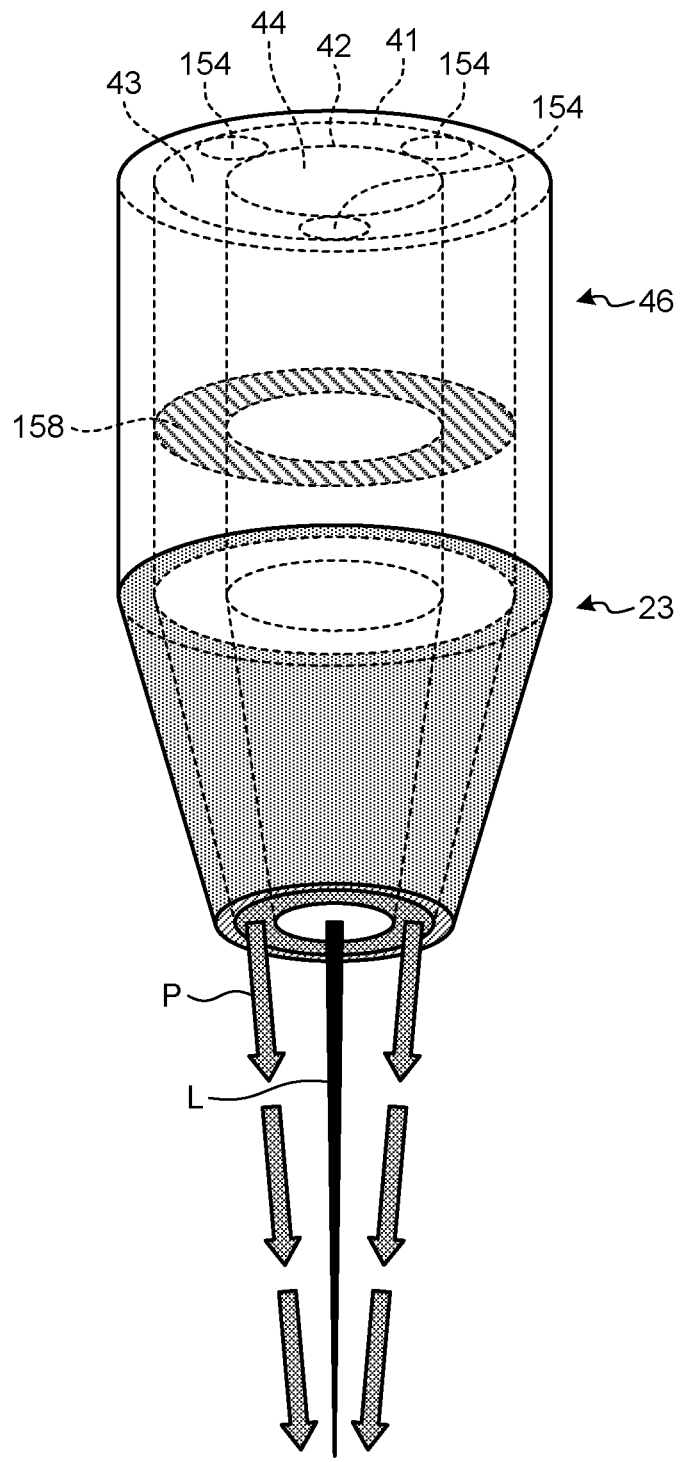
FIG. 5 is a perspective view illustrating a schematic configuration of a structure that supplies a powder material in the periphery of a nozzle of the deposition head.
Figure 6:
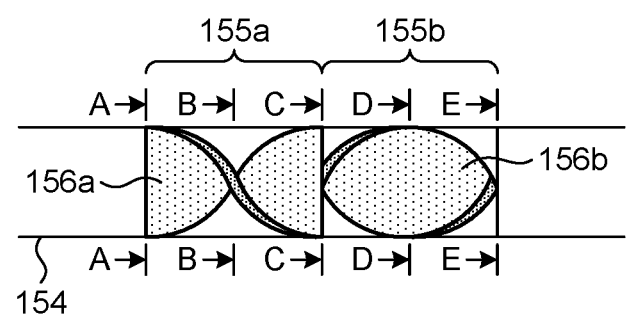
FIG. 6 is a schematic diagram illustrating a schematic configuration of a mixing unit.
Figure 7:
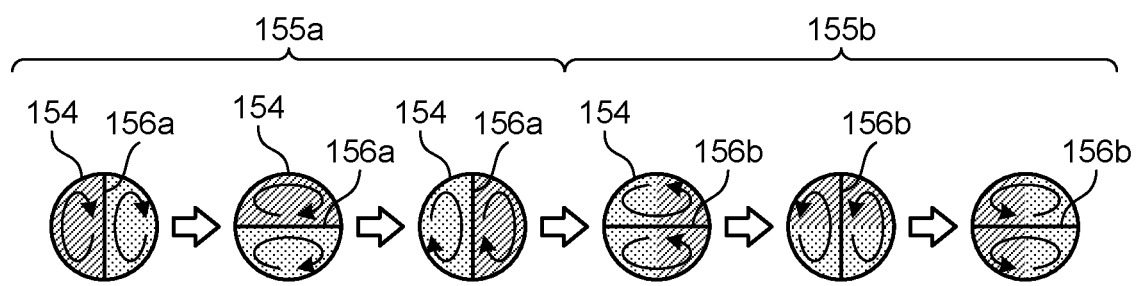
FIG. 7 is an explanatory diagram illustrating a change in cross-section of the mixing unit.

Next, a supply path of the powder material of the deposition head 12 will be described in more detail. FIG. 3 is a schematic diagram illustrating a schematic configuration of a structure that supplies the powder material of the deposition head. FIG. 4 is a development diagram illustrating a schematic configuration of a branch tube and a distribution unit of the deposition head. FIG. 5 is a perspective view illustrating a schematic configuration of a structure that supplies the powder material in the periphery of the nozzle of the deposition head. FIG. 6 is a schematic diagram illustrating a schematic configuration of a mixing unit. FIG. 7 is an explanatory diagram illustrating a change in cross-section of the mixing unit. As illustrated in FIG. 2, the powder material is supplied from the powder introduction unit 35 to the deposition head 12 through a powder supply tube 150. The deposition head 12 includes a distribution unit 152 and a plurality of branch tubes 154 as a mechanism that supplies the supplied powder material to the powder passage 43.

The distribution unit (distributor) 152 equalizes the powder supplied from the powder supply tube 150 and supplies the powder to the branch tube 154. The plurality of branch tubes 154 are tubes which connect the distribution unit 152 and the powder passage 43 to each other and supply the powder P supplied from the distribution unit 152 to the powder passage 43. In the deposition head 12 of the embodiment, as illustrated in FIG. 5, three branch tubes 154 are disposed equally, that is, at an interval of 120° in a circumferential direction.

A mixing unit 156 is provided inside the branch tube 154. The mixing unit 156 is an mechanism that equalizes the powder P flowing through the branch tube 154 inside the branch tube 154 and a plurality of stirring plates 156a and 156b are disposed therein. As illustrated in FIGS. 4, 6, and 7, the stirring plates 156a and 156b are twisted about the axial direction of the branch tube 154 along the flow direction of the branch tube 154. Further, the stirring plate 156a disposed in a range 155a and the stirring plate 156b disposed in a range 155b are twisted in opposite directions. Accordingly, a fluid passing through the mixing unit 156 is formed so that a stream changes in response to an axial position of the branch tube 154 as illustrated in FIG. 7. Thus, a stirring operation is promoted. Additionally, FIG. 7 illustrates the stirring plate 156a taken along lines A-A, B-B, and C-C of FIG. 6 and illustrates the stirring plate 156b taken along lines C-C, D-D, and E-E from the left side. Further, in the embodiment, three branch tubes 154 are provided, but the number is not particularly limited. It is desirable to equally dispose the branch tubes 154 at a constant interval in a circumferential direction.

Further, the deposition head 12 is formed so that a flow straightening device 158 is provided in the powder passage 43. The flow straightening device 158 straightens a flow of the powder material supplied from three branch tubes 154. Accordingly, the deposition head 12 can arrange the flow of the powder material injected from the powder passage 43 and thus supply the powder material to a desired position with high accuracy.

The machining unit 13 is used to machine, for example, a formed layer or the like. As illustrated in FIG. 1, the machining unit 13 is provided at a position facing the upper face of the bed 10 in the Z-axis direction and faces the table unit 11. The tool 22 is attached to a lower part of the machining unit 13 in the Z-axis direction. Additionally, the machining unit 13 may be provided in the movable range of the base unit 100 using the table unit 11 above the bed 10 in the Z-axis direction. Here, the arrangement position is not limited to the position of the embodiment.

Figure 8:
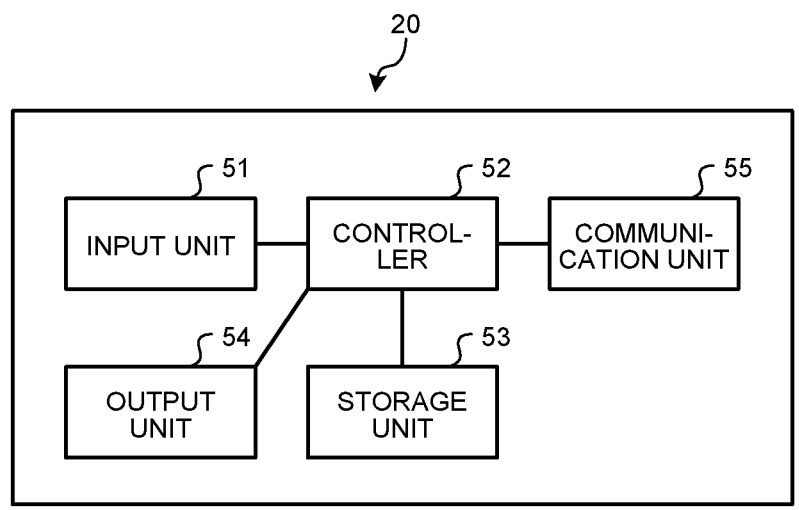
FIG. 8 is a schematic diagram illustrating a configuration of a control device.

FIG. 8 is a schematic diagram illustrating a configuration of the control device 20. The control device 20 is electrically connected to the components of the three-dimensional deposition device 1 and controls the operations of the components of the three-dimensional deposition device 1. The control device 20 is provided at the outside of the three-dimensional deposition chamber 2 or the spare chamber 3. The control device 20 includes, as illustrated in FIG. 8, an input unit 51, a controller 52, a storage unit 53, an output unit 54, and a communication unit 55. The components of the input unit 51, the controller 52, the storage unit 53, the output unit 54, and the communication unit 55 are electrically connected to one another.

The input unit 51 is, for example, an operation panel. An operator inputs information or an instruction to the input unit 51. The controller 52 includes, for example, a CPU (Central Processing Unit) and a memory. The controller 52 outputs an instruction for controlling the operations of the components of the three-dimensional deposition device 1 to the components of the three-dimensional deposition device 1. Further, information is input to the controller 52 from the components of the three-dimensional deposition device 1. The storage unit 53 is, for example, a storage device such as a RAM (Random Access Memory) or a ROM (Read Only Memory). The storage unit 53 stores an operation program for the three-dimensional deposition device 1 controlling the operations of the components by the controller 52 executing the program, information of the three-dimensional deposition device 1, or design information of the three-dimensional object. The output unit 54 is, for example, a display. The output unit 54 displays, for example, information of the components of the three-dimensional deposition device 1. The communication unit 55 exchanges information with, for example, a communication line such as the Internet or a LAN (Local Area Network) by communicating with the communication line. Additionally, the control device 20 may include at least the controller 52 and the storage unit 53. The control device 20 may output an instruction to the components of the three-dimensional deposition device 1 if the controller 52 and the storage unit 53 are provided.

Figure 9:
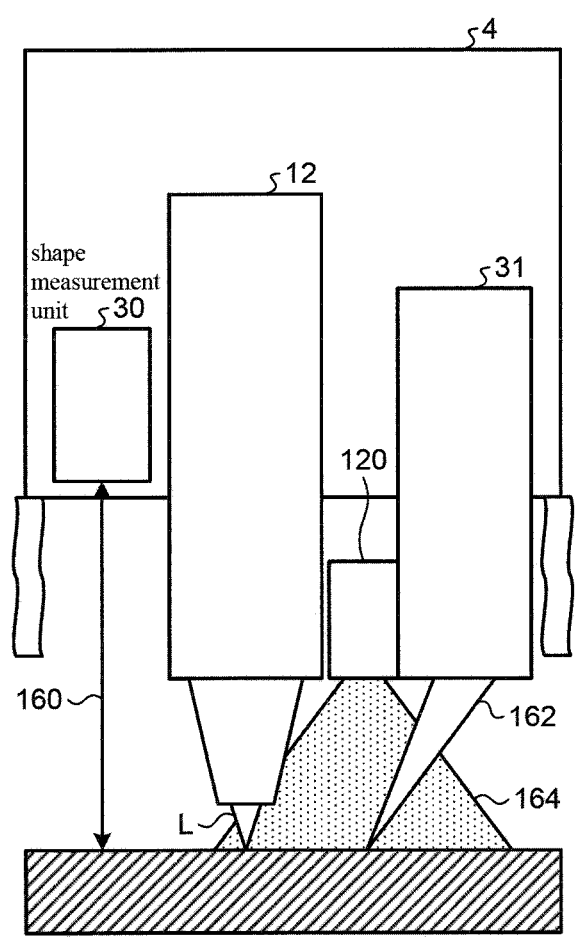
FIG. 9 is a schematic diagram illustrating a schematic configuration of each component provided in a deposition head accommodation chamber.

As illustrated in FIG. 9, the shape measurement unit 30 is fixed to the deposition head accommodation chamber 4. The shape measurement unit 30 is disposed adjacent to the deposition head 12. The shape measurement unit 30 measures a surface shape of the formed layer formed on the base unit 100. As the shape measurement unit 30, for example, a 3D scanner or a device measuring a relative distance can be used. For example, the shape measurement unit 30 performs scanning the surface of the formed layer on the base unit 100 by a laser beam to calculate position information (distance of arrow 160) of the surface of the formed layer from reflected light. The shape measurement unit then measures the surface shape of the formed layer. Further, in the embodiment, the shape measurement unit 30 is attached to the deposition head accommodation chamber 4. However, the shape measurement unit 30 may be attached to a different position as long as the surface shape of the formed layer formed on the base unit 100 can be measured.

The heating head 31 heats the formed layer or the melted powder P on the base unit 100. The heating head 31 is fixed to the deposition head accommodation chamber 4. The heating head 31 is disposed near the deposition head 12. The heating head 31 heats the formed layer or the melted powder P by emitting, for example, a laser beam, infrared light, or electromagnetic waves thereto. When the formed layer or the melted powder P is heated by the heating head 31, a temperature of the formed layer or the melted powder P can be controlled. Accordingly, it is possible to suppress an abrupt decrease in temperature of the formed layer or the melted powder P or to form an atmosphere (a high-temperature environment) in which the powder P is easily melted.

The temperature detection unit 120 is disposed adjacent to the heating head 31. FIG. 9 is a schematic diagram illustrating a schematic configuration of each component provided in the deposition head accommodation chamber 4. As illustrated in FIG. 9, the temperature detection unit 120 outputs a measurement wave 164 to a range including a position irradiated with the laser beam L and a range heated by a laser beam 162 emitting from the heating head 31 to measure the temperature. As the temperature detection unit 120, various temperature sensors that measure a temperature of a surface provided with the formed layer can be used.

The weight detection unit 130 detects a weight of the base unit 100 attached to the rotation table 17d of the rotation table unit 17. A load cell can be used as the weight detection unit 130.

Figure 10:
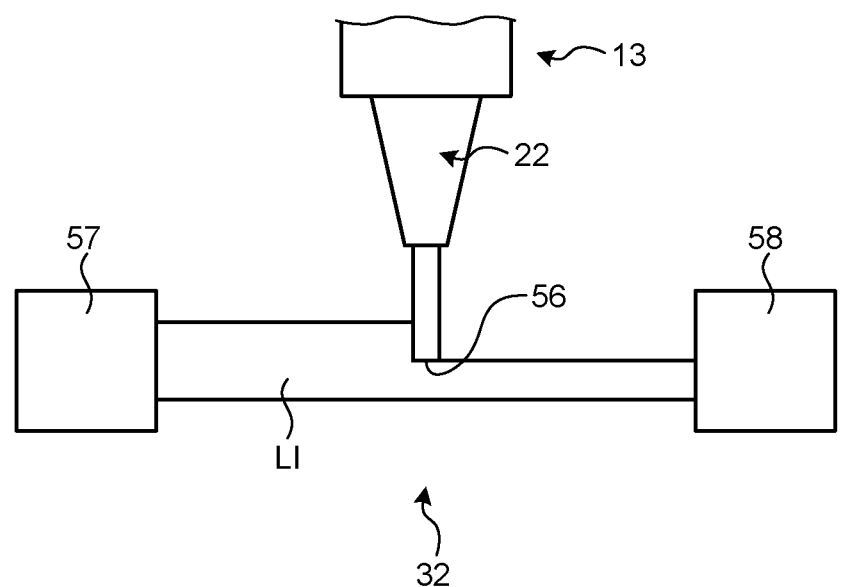
FIG. 10 is a schematic diagram illustrating an example of a machining measurement unit.

The machining measurement unit 32 measures a position of a front end 56 of the tool 22 of the machining unit 13. FIG. 10 is a schematic diagram illustrating an example of the machining measurement unit 32. As illustrated in FIG. 10, the machining measurement unit 32 includes a light source unit 57 and an image capturing unit 58. In the machining measurement unit 32, the front end 56 of the tool 22 of the machining unit 13 is located between the light source unit 57 and the image capturing unit 58. The light source unit 57 is, for example, an LED. The image capturing unit 58 is, for example, a CCD (Charge Coupled Device) camera. The machining measurement unit 32 irradiates the image capturing unit 58 with light LI from the light source unit 57 while the front end 56 of the tool 22 is disposed between the light source unit 57 and the image capturing unit 58. The machining measurement unit 32 then acquires an image by the image capturing unit 58. Accordingly, it is possible to acquire an image in which light is interrupted by the front end 56 of the tool 22. The machining measurement unit 32 can acquire a shape and a position of the front end 56 by analyzing the image acquired by the image capturing unit 58 and specifically detecting a boundary between a light incident position and a non-light incident position. The control device 20 detects an accurate position of the front end of the tool 22 attached to the machining unit 13 based on the acquired position of the front end 56 of the tool 22 and a position of the machining unit 13 (a position of the machining unit accommodation chamber 5). Additionally, the machining measurement unit 32 is not limited to this configuration as long as measuring the position of the front end 56 of the machining unit 13. For example, the front end may be measured by a laser beam.

The tool exchange unit 33 is disposed inside the three-dimensional deposition chamber 2. The tool exchange unit 33 exchanges the tool 22 attached to the machining unit 13. The tool exchange unit 33 moves a part which does not grip the tool 22 to a position facing the machining unit 13. Subsequently, the tool exchange unit 33 moves a part which does not grip the tool 22 to a position facing the machining unit 13. Subsequently, the tool exchange unit separates the tool 22 attached to the machining unit 13. Then, the tool exchange unit moves a part which grips a different tool 22 to be attached to the machining unit 13 to a position facing the machining unit 13 and attaches the different tool 22 to the machining unit 13. In this way, the tool exchange unit 33 can exchange the tool 22 of the machining unit 13 by attaching or separating the tool 22 of the machining unit 13. Additionally, the tool exchange unit 33 is not limited to this configuration as long as the tool 22 of the machining unit 13 can be exchanged.

The nozzle exchange unit 34 is disposed inside the three-dimensional deposition chamber 2. The nozzle exchange unit 34 exchanges the nozzle 23 attached to the deposition head 12. The nozzle exchange unit 34 can use the same structure as that of the tool exchange unit 33.

Figure 11A:
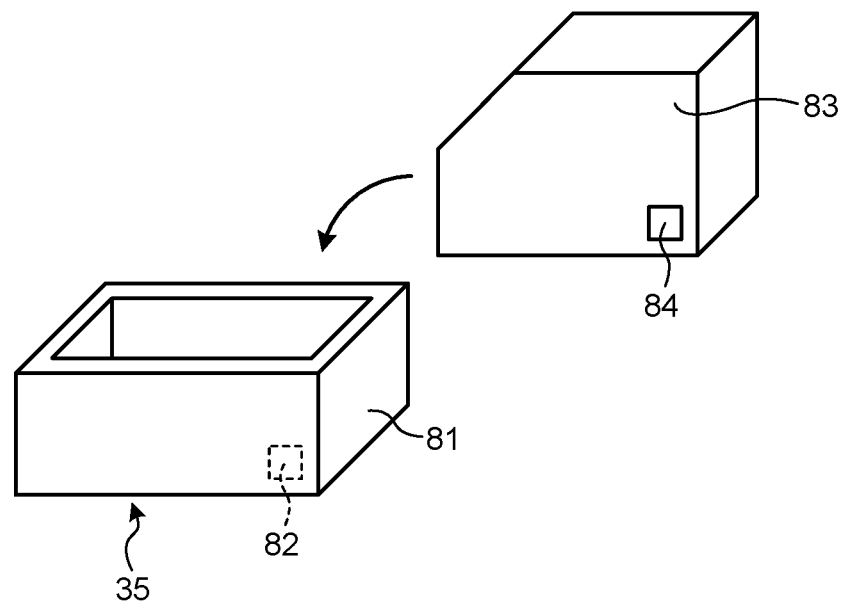
FIG. 11A is a schematic diagram illustrating an example of a powder introduction unit.
Figure 11B:
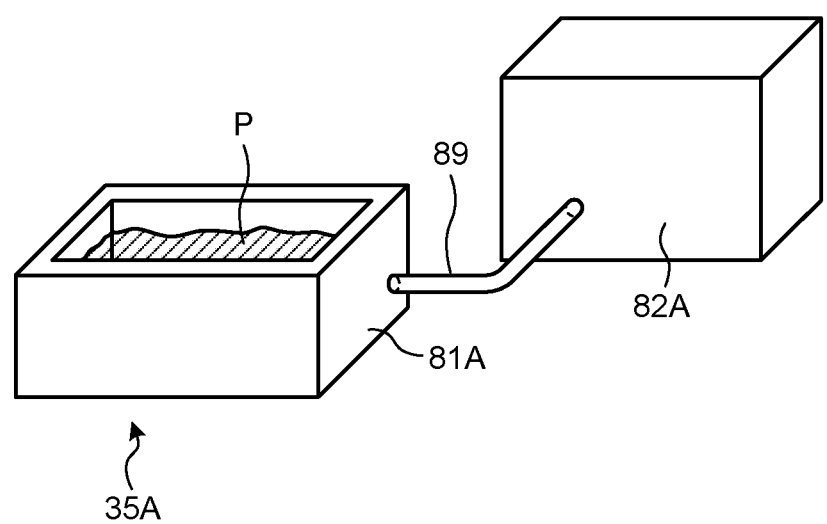
FIG. 11B is a schematic diagram illustrating an example of the powder introduction unit.

The powder introduction unit 35 introduces a powder material which becomes a raw material of a three-dimensional object to the deposition head 12. FIGS. 11A and 11B are schematic diagrams illustrating examples of the powder introduction unit. As illustrated in FIG. 11A, in the embodiment, the powder P is managed while being enclosed in a cartridge 83. That is, the powder is shipped while being enclosed in the cartridge 83 in accordance with, for example, the type of material. The cartridge 83 is provided with a material display part 84. The material display part 84 is, for example, a display which indicates powder information such as a material type. The material display part 84 is not limited to information which can be checked by eyes and may be an IC chip or a two-dimensional code or mark. This information can be acquired by a reader. The material display part 84 is not limited thereto as long as the type of powder can be displayed. The material display part 84 can indicate, for example, powder information necessary for manufacturing the three-dimensional object such as a particle size, a weight, purity of powder or an oxide coating of powder other than the type of powder. Further, the material display part 84 may include information which indicates whether the powder is a regular product.

The powder introduction unit 35 includes a powder storage unit 81 and a powder identification unit 82. The powder storage unit 81 is, for example, a box-shaped member and accommodates the cartridge 83 therein. The powder storage unit 81 is connected to a carrying air supply part which carries out the powder or a carrying path through which the powder is carried to the deposition head 12. The powder storage unit 81 introduces the powder stored in the cartridge 83 into the deposition head 12 when the cartridge 83 is accommodated therein. When the powder identification unit 82 detects a state where the cartridge 83 is accommodated in the powder storage unit 81, the material display part 84 of the cartridge 83 is read so that the information of the powder stored in the cartridge 83 is read. The powder introduction unit 35 can supply known powder to the deposition head 12 by acquiring the powder information by the powder identification unit 82.

Here, the powder introduction unit 35 may supply a powder which is not managed while being enclosed in the cartridge 83 to the deposition head 12. FIG. 11B illustrates a powder introduction unit 35A in which the powder is not enclosed in the cartridge. The powder introduction unit 35A includes a powder storage unit 81A, a powder identification unit 82A, and a powder guide tube 89 which connects the powder storage unit 81A and the powder identification unit 82A to each other. The powder storage unit 81A is, for example, a box-shaped member and stores the powder P therein. The powder identification unit 82A analyzes the powder supplied through the powder guide tube 89 and measures the powder information necessary for manufacturing the three-dimensional object such as a particle size, a weight, purity of powder or an oxide coating of powder. As the powder identification unit 82A, a spectral analysis device which identifies a powder material by a spectral analysis, a particle size analysis device which measures a powder particle size by a particle size analysis, and a weight measurement device which measures a powder weight can be used. The powder identification unit 82A measures powder purity from, for example, the type, the particle size, and the weight of the powder measured as described above. Further, the powder identification unit 82A measures the oxide coating of the powder by, for example, conductivity. The powder introduction unit 35A also can supply known powder to the deposition head 12 by acquiring the powder information by the powder identification unit 82A.

The base movement unit 36 is disposed in the spare chamber 3. The base movement unit 36 moves a base unit 100a from the inside of the spare chamber 3 into the three-dimensional deposition chamber 2 and moves the base unit 100 inside the three-dimensional deposition chamber 2 into the spare chamber 3. The base unit 100a which is carried into the spare chamber 3 from the outside is attached to the base movement unit 36. The base movement unit 36 carries the base unit 100a attached thereto from the spare chamber 3 into the three-dimensional deposition chamber 2. More specifically, the base movement unit 36 moves the base unit 100a attached to the base movement unit 36 into the three-dimensional deposition chamber 2 so that the base unit is attached to the rotation table unit 17. The base movement unit 36 moves the base unit 100 by, for example, a robot arm or an orthogonal carrying device.

The air discharge unit 37 is, for example, a vacuum pump and discharges air inside the three-dimensional deposition chamber 2. The gas introduction unit 38 introduces a gas having a predetermined element, for example, an inert gas such as argon and nitrogen into the three-dimensional deposition chamber 2. The three-dimensional deposition device 1 discharges the air of the three-dimensional deposition chamber 2 by the air discharge unit 37 and introduces a gas into the three-dimensional deposition chamber 2 by the gas introduction unit 38. Accordingly, the three-dimensional deposition device 1 can form a desired gas atmosphere inside the three-dimensional deposition chamber 2. Here, in the embodiment, the gas introduction unit 38 is provided below the air discharge unit 37 in the Z-axis direction. When the three-dimensional deposition device 1 uses argon having a specific weight higher than that of a gas such as oxygen in air as an introduction gas while the gas introduction unit 38 is provided below the air discharge unit 37 in the Z-axis direction, an argon gas can be appropriately charged into the three-dimensional deposition chamber 2. Additionally, when the introduction gas is set as a gas lighter than air, a pipe may be disposed in an opposite way.

The powder collection unit 39 collects the powder P which is injected from the nozzle injection opening 45 of the deposition head 12 and is not used to form a formed layer. The powder collection unit 39 suctions the air inside the three-dimensional deposition chamber 2 and collects the powder P included in the air. The powder P which is injected from the deposition head 12 is melted and solidified by the laser beam L so that a formed layer is formed. However, since a part of the powder P is not irradiated with, for example, the laser beam L, there is a case where the powder is left inside the three-dimensional deposition chamber 2. Further, chips which are cut by the machining unit 13 and are discharged from the formed layer are left in the three-dimensional deposition chamber 2. The powder collection unit 39 collects the powder P or chips left in the three-dimensional deposition chamber 2. The powder collection unit 39 may include an assembly such as a brush which mechanically collects the powder.

Figure 12:
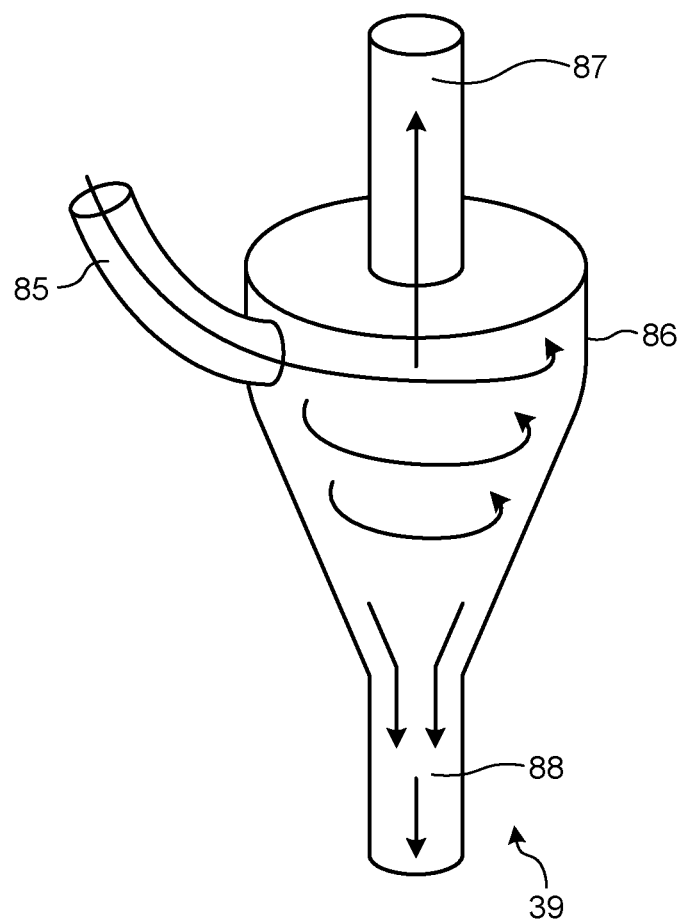
FIG. 12 is a schematic diagram illustrating an example of a powder collection unit.

FIG. 12 is a schematic diagram illustrating an example of the powder collection unit 39. As illustrated in FIG. 12, the powder collection unit 39 includes an introduction part 85, a cyclone part 86, a gas discharge part 87, and a powder discharge part 88. The introduction part 85 is, for example, a tubular member and one end thereof is connected to, for example, the inside of the three-dimensional deposition chamber 2. The cyclone part 86 is, for example, a hollow truncated conical member and is formed so that a diameter decreases as it goes downward in, for example, the vertical direction. The other end of the introduction part 85 is connected to the cyclone part 86 in a tangential direction of an outer periphery of the cyclone part 86. The gas discharge part 87 is a tubular member and one end thereof is connected to an upper end of the cyclone part 86 in the vertical direction. The powder discharge part 88 is a tubular member and one end thereof is connected to a lower end of the cyclone part 86 in the vertical direction.

For example, a pump which suctions a gas is connected to the other end of the gas discharge part 87. Thus, the gas discharge part 87 suctions a gas from the cyclone part 86 to form a negative pressure in the cyclone part 86. Since the cyclone part 86 has a negative pressure, the introduction part 85 suctions a gas from the three-dimensional deposition chamber 2. The introduction part 85 suctions the powder P which is not used to form the formed layer along with the gas inside the three-dimensional deposition chamber 2. The introduction part 85 is connected to the cyclone part 86 in the tangential direction of the outer periphery of the cyclone part 86. Thus, the gas and the powder P which are suctioned to the introduction part 85 turn along an inner periphery of the cyclone part 86. Since the powder P has a specific weight higher than that of the gas, the powder is centrifugally separated outward in a radiation direction at the inner periphery of the cyclone part 86. The powder P is directed toward the lower powder discharge part 88 in an extension direction by the own weight and is discharged from the powder discharge part 88. Further, the gas is discharged by the gas discharge part 87.

The powder collection unit 39 collects the powder P which is not used to form the formed layer in this way. Further, the powder collection unit 39 of the embodiment may separately collect the powder P in accordance with each specific weight. For example, since the powder having a low specific weight has a small weight, the powder is not directed toward the powder discharge part 88 and is suctioned to the gas discharge part 87. Thus, the powder collection unit 39 can separately collect the powder P in accordance with the specific weight. Additionally, the powder collection unit 39 is not limited to such a configuration as long as the powder P which is not used to form the formed layer can be collected.

Figure 13:
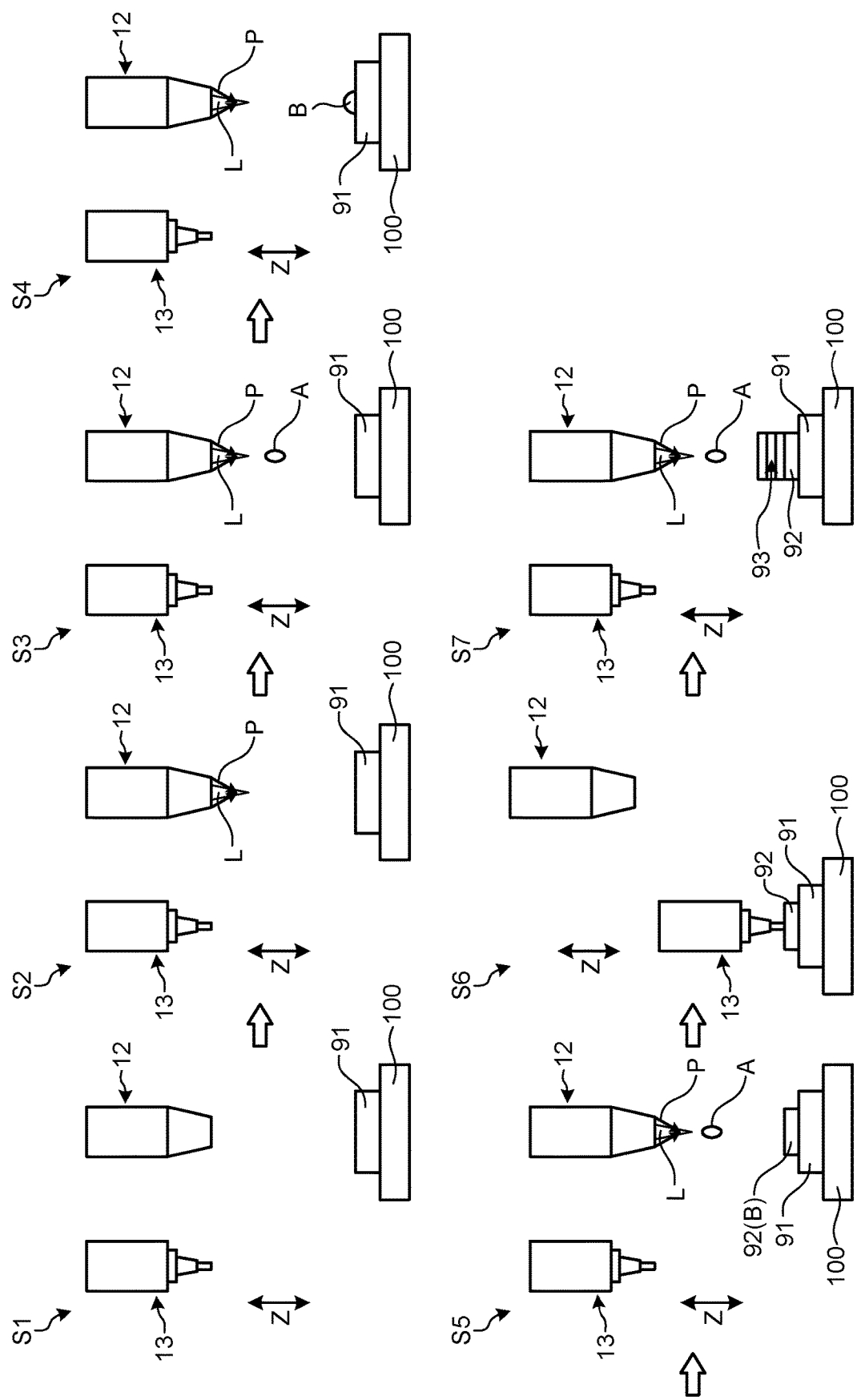
FIG. 13 is an explanatory diagram illustrating a three-dimensional object manufacturing method by the three-dimensional deposition device according to the embodiment.

Next, a three-dimensional object manufacturing method using the three-dimensional deposition device 1 will be described. FIG. 13 is a schematic diagram illustrating the three-dimensional object manufacturing method by the three-dimensional deposition device 1 according to the embodiment. The manufacturing method illustrated in FIG. 13 can be performed by the control to the operations of the components of the control device 20. In the embodiment, a case will be described in which a three-dimensional object is manufactured on a pedestal 91. The pedestal 91 is, for example, a metallic plate-shaped member, but the shape and the material thereof may be arbitrarily set as long as the three-dimensional object is formed thereon. The pedestal 91 is attached on the base unit 100. The base unit 100 is fixed to the rotation table unit 17 of the table unit 11 along with the pedestal 91. Additionally, the pedestal 91 can be set as the base unit 100.

As illustrated in step S1, the control device 20 moves the base unit 100 so that the pedestal 91 of the base unit 100 is disposed below the deposition head 12 in the Z-axis direction by the table unit 11.

Next, as illustrated in step S2, the control device 20 introduces the powder from the powder introduction unit 35 into the deposition head 12 and emits the laser beam L while injecting the powder P from the deposition head 12 along with the gas. The powder P has a predetermined convergence diameter and is injected toward the pedestal 91 of the base unit 100. The laser beam L is emitted to the powder P with a predetermined spot diameter between the deposition head 12 and the pedestal 91. Here, the position of the spot diameter of the laser beam L in the Z-axis direction with respect to the position of the convergence diameter of the powder P in the Z-axis direction and the spot diameter at the position of the convergence diameter of the powder P in the Z-axis direction can be controlled by, for example, the movement of the position of the light concentrating unit 49.

As illustrated in step S3, the control device 20 injects the powder P from the deposition head 12 while emitting the laser beam L so that the powder P is melted by the irradiation with the laser beam L. The melted powder P which is a molten body A falls downward in the Z-axis direction toward the pedestal 91 of the base unit 100.

The molten body A which falls downward in the Z-axis direction reaches a predetermined position of the pedestal 91 of the base unit 100. The molten body A on the pedestal 91 is cooled at a predetermined position on the pedestal 91 by, for example, heat radiation. As illustrated in step S4, the cooled molten body A is solidified as a solid body B on the pedestal 91.

The control device 20 forms the solid body B on the base unit 100 by the deposition head 12 according to a sequence from step S2 to step S4 while moving the base unit 100 to a predetermined position by the table unit 11. When these sequences are repeated, as illustrated in step S5, the solid body B forms a formed layer 92 having a predetermined shape on the pedestal 91.

As illustrated in step S6, the control device 20 moves the pedestal 91 of the base unit 100 by the table unit 11 so that the formed layer 92 formed on the pedestal 91 is disposed below the machining unit 13 in the Z-axis direction. Further, the control device 20 performs a machining operation on the formed layer 92 by the machining unit 13. The control device 20 determines whether to perform a machining operation by the machining unit 13. If this machining operation is not necessary, the machining operation may not be performed. Thus, there is a case where the machining operation illustrated in step S6 is not performed in accordance with the instruction of the control device 20.

Next, as illustrated in step S7, the control device 20 moves the base unit 100 by the table unit 11 so that the formed layer 92 formed on the pedestal 91 is disposed below the deposition head 12 in the Z-axis direction. Then, the sequence from step S2 to step S6 is repeated so that a formed layer 93 is sequentially deposited on the formed layer 92 and thus the three-dimensional object is manufactured.

From the description above, the three-dimensional deposition device 1 according to the embodiment manufactures the three-dimensional object as below. The powder injection unit of the deposition head 12 injects the powder P toward the pedestal 91 of the base unit 100. Further, the inner tube 42 of the deposition head 12 irradiates the powder P provided between the deposition head 12 and the pedestal 91 with the laser beam L. The powder P which is irradiated with the laser beam L is melted and solidified on the pedestal 91 of the base unit 100 and thus the formed layer 92 is formed. The three-dimensional deposition device 1 sequentially deposits the formed layer 93 on the formed layer 92 and performs an appropriate machining operation on the formed layers 92 and 93 by the machining unit 13 to manufacture the three-dimensional object.

In the embodiment, the three-dimensional object is manufactured on the pedestal 91, but the three-dimensional object may not be manufactured on the pedestal 91. The three-dimensional object may be directly manufactured on, for example, the base unit 100. Further, the three-dimensional deposition device 1 may perform so-called overlay welding by depositing a formed layer on an existing shaped material.

Figure 14A:
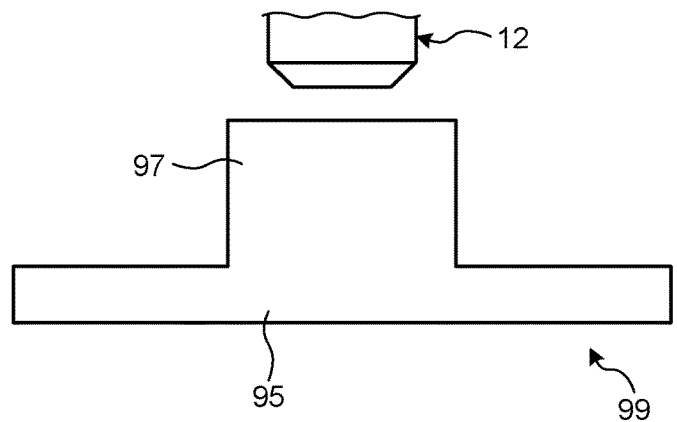
FIG. 14A is an explanatory diagram illustrating the three-dimensional object manufacturing method by the three-dimensional deposition device according to the embodiment.
Figure 14B:
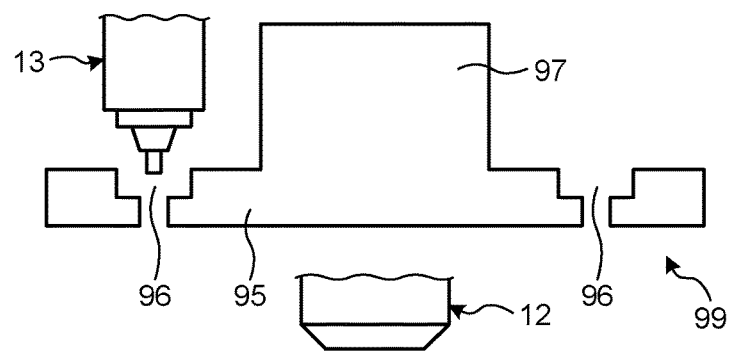
FIG. 14B is an explanatory diagram illustrating the three-dimensional object manufacturing method by the three-dimensional deposition device according to the embodiment.
Figure 14C:
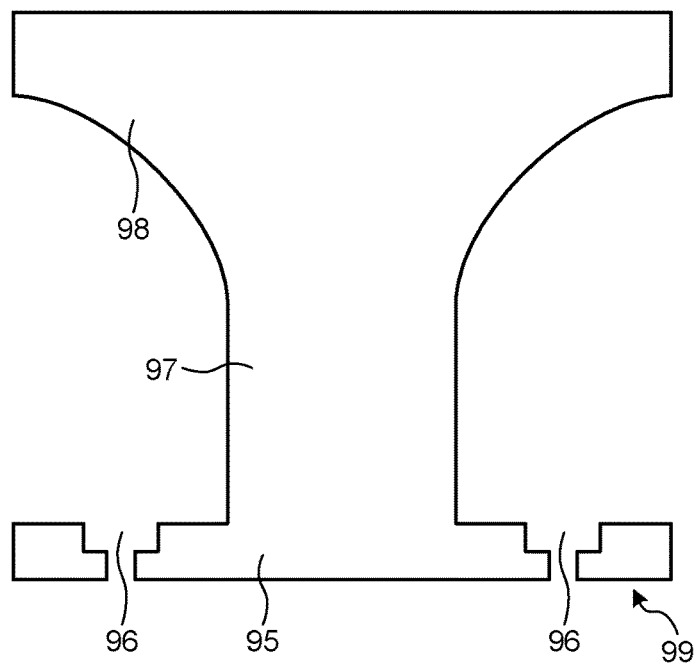
FIG. 14C is an explanatory diagram illustrating the three-dimensional object manufacturing method by the three-dimensional deposition device according to the embodiment.

In the embodiment, the machining unit 13 is used to perform, for example, a machining operation on the surface of the formed layer 92, but may perform a machining operation on the other part. FIGS. 14A to 14C are schematic diagrams illustrating a three-dimensional object manufacturing method by the three-dimensional deposition device 1 according to the embodiment. FIGS. 14A to 14C illustrate a sequence of manufacturing a member 99 illustrated in FIG. 14C by the three-dimensional deposition device 1.

The member 99 includes a disc part 95, a shaft part 97, and a truncated conical part 98. Further, the member 99 is formed so that a threaded hole 96 is formed in the disc part 95. As illustrated in FIG. 14C, the disc part 95 is a disc-shaped member. The shaft part 97 is a shaft-shaped member that has a diameter smaller than that of the disc part 95 and extends from a center of one face of the disc part 95. The threaded hole 96 is provided at the outside of the shaft part 97 of the disc part 95. The truncated conical part 98 is provided at a front end of the shaft part 97 and is formed so that an outer diameter increases as it goes toward an opposite side to the disc part 95. A long diameter of the truncated conical part 98 is equal to, for example, an outer diameter of the disc part 95. That is, the threaded hole 96 is located at the inside of the long diameter of the truncated conical part 98.

Next, a sequence of manufacturing the member 99 by the three-dimensional deposition device 1 will be described. As illustrated in FIG. 14A, the three-dimensional deposition device 1 forms the disc part 95 and the shaft part 97 by depositing the formed layer through the deposition head 12. After the disc part 95 and the shaft part 97 are manufactured, the three-dimensional deposition device 1 forms the threaded hole 96 by the machining unit 13 as illustrated in FIG. 14B. After the threaded hole 96 is formed, the three-dimensional deposition device 1 forms the truncated conical part 98 on the shaft part 97 by depositing the formed layer through the deposition head 12. The member 99 is manufactured in this way.

Here, a long diameter part of the truncated conical part 98 is located at the outside of the threaded hole 96. In other words, an area above the threaded hole 96 is covered by the truncated conical part 98. Thus, for example, when the member 99 is manufactured by a machining operation, a processing tool for the threaded hole 96 cannot be moved from an area above the truncated conical part 98 toward the disc part 95. However, the three-dimensional deposition device 1 forms the threaded hole 96 before the truncated conical part 98 is manufactured. In this case, the area above the threaded hole 96 is not covered. Thus, the three-dimensional deposition device 1 can process the threaded hole 96 by moving the machining unit 13 along the Z-axis direction from above in the Z-axis direction. In this way, the machining unit 13 can easily perform a machining operation by adjusting timing for the formed layer forming operation and the machining operation.

Figure 15:
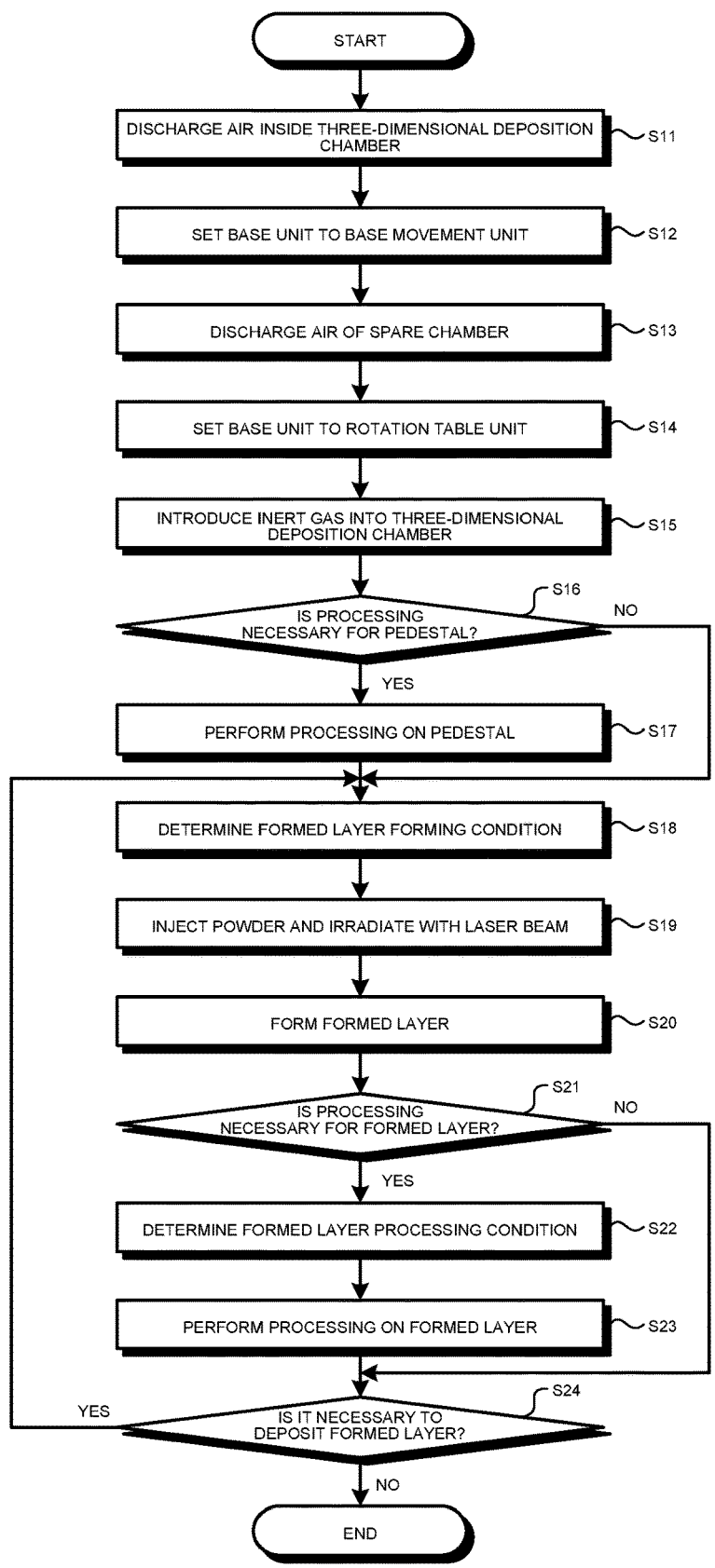
FIG. 15 is a flowchart illustrating a three-dimensional object manufacturing step by the three-dimensional deposition device according to the embodiment.

Next, a detailed process of manufacturing the three-dimensional object by the three-dimensional deposition device 1 according to the embodiment will be described. FIG. 15 is a flowchart illustrating a step of manufacturing the three-dimensional object by the three-dimensional deposition device 1 according to the embodiment. The control device 20 reads, for example, the three-dimensional object design information stored in the storage unit 53.

Next, the control device 20 discharges air in the three-dimensional deposition chamber 2 by the air discharge unit 37 (step S11). Here, the three-dimensional deposition chamber 2 is separated from the spare chamber 3 while the door 6 is closed. Further, in the three-dimensional deposition chamber 2, a part which communicates with the other external air is also closed and sealed. For example, the control device 20 discharges air from the air discharge unit 37 so that an oxygen concentration in the three-dimensional deposition chamber 2 is 100 ppm or less and desirably 10 ppm or less. The control device 20 can set an inert state by changing the oxygen concentration inside the three-dimensional deposition chamber 2 to 100 ppm or less and further reliably set an inert state by changing the oxygen concentration to 10 ppm or less.

Next, the base unit 100 with the pedestal 91 is attached to the base movement unit 36 inside the spare chamber 3 (step S12). Additionally, the three-dimensional deposition device 1 may perform a process in step S12 prior to a process in step S11.

After the base movement unit 36 in the spare chamber 3 is attached, the control device 20 closes the door 7 of the spare chamber 3 and discharges air inside the spare chamber 3 by the air discharge unit 25 (step S13). The control device 20 discharges air by the air discharge unit 25 so that the oxygen concentration in the spare chamber 3 decreases. It is desirable that the oxygen concentration inside the spare chamber 3 be equal to, for example, the oxygen concentration inside the three-dimensional deposition chamber 2.

When the air of the spare chamber 3 is completely discharged, the control device 20 opens the door 6 of the three-dimensional deposition chamber 2 and attaches the base unit 100 to the rotation table unit 17 inside the three-dimensional deposition chamber 2 by the base movement unit 36 (step S14). The base unit 100 is fixed to the rotation table unit 17. After the base unit 100 is attached to the rotation table unit 17, the control device 20 returns the base movement unit 36 into the spare chamber 3 and closes the door 6.

After the base unit 100 is set to the rotation table unit 17, the control device 20 introduces a gas into the three-dimensional deposition chamber 2 by the gas introduction unit 38 (step S15). The control device 20 forms an atmosphere of an introduction gas inside the three-dimensional deposition chamber 2 by the gas introduction unit 38. In the embodiment, the gas which is introduced by the gas introduction unit 38 is an inert gas such as nitrogen or argon. The gas introduction unit 38 introduces the inert gas so that the residual oxygen concentration in the three-dimensional deposition chamber 2 becomes 100 ppm or less.

Further, the three-dimensional deposition device 1 may omit step S11, step S13, and step S15 in accordance with the type of powder material. For example, when any problem does not occur in the quality of the three-dimensional object even by the oxidization of the powder material, these steps may be omitted so that the three-dimensional deposition chamber 2 and the spare chamber 3 have atmospheric air.

When the inert gas is completely introduced into the three-dimensional deposition chamber 2, the control device 20 determines whether to perform a machining operation on the pedestal 91 of the base unit 100 (step S16). For example, the control device 20 measures a surface shape of the pedestal 91 by the shape measurement unit 30. The control device 20 determines whether to perform a machining operation on the pedestal 91 based on a measurement result of the shape measurement unit 30. For example, when surface roughness of the pedestal 91 is larger than a predetermined value, the control device 20 determines that the machining operation is performed on the pedestal 91. Here, the determination on whether the machining operation needs to be performed on the pedestal 91 by the control device 20 is not limited thereto and may not be performed by the measurement result of the shape measurement unit 30. The control device 20 may store, for example, information of the pedestal 91 in the storage unit 53. The control device 20 may determine whether the pedestal 91 needs to be processed based on the information of the pedestal 91 and the three-dimensional object design information. The control device 20 may be set to process the pedestal 91 at all times.

When the control device 20 determines that the machining operation for the pedestal 91 is needed (Yes in step S16), the control device 20 performs the machining operation for the pedestal 91 at a predetermined condition by the machining unit 13 (step S17). The control device 20 determines a condition of the machining operation for the pedestal 91 based on, for example, the shape measurement result of the pedestal 91 obtained by the shape measurement unit 30 or the information of the pedestal 91 and the three-dimensional object design information.

When the control device 20 determines that the processing for the pedestal 91 is not needed (No in step S16) or the machining operation for the pedestal 91 is performed at a predetermined condition, the control device 20 determines the formed layer forming condition based on, for example, the three-dimensional object design information read from the storage unit 53 (step S18). For example, the formed layer forming condition is a condition necessary to form the formed layer and includes a shape of each formed layer, a type of powder P, an injection speed of the powder P, an injection pressure of the powder P, an irradiation condition of the laser beam L, a positional relation among a convergence diameter of the powder P, a spot diameter of the laser beam L, and a formed layer surface, a dimension and a temperature of the melted powder P in air, a dimension of a molten pool formed on a formed layer surface, a cooling speed, or a movement speed of the base unit 100 using the table unit 11.

When the control device 20 determines the formed layer forming condition, the deposition head 12 injects the powder P toward the pedestal 91 on the base unit 100 and starts to emit the laser beam L thereto (step S19). Since the control device 20 emits the laser beam L while injecting the powder P, the powder P can be melted by the laser beam L, the melted powder P can be solidified, and a solid body B is formed on the pedestal 91.

The control device 20 forms the formed layer 92 on the pedestal 91 by moving the base unit 100 using the table unit 11 while injecting the powder P and emitting the laser beam L (step S20). The control device 20 may heat the formed layer 92 or a part to which the solid body is not yet adhered by the heating head 31.

After the formed layer 92 is formed, the control device 20 determines whether a machining operation for the formed layer 92 is needed (step S21). For example, the control device 20 causes the shape measurement unit 30 to measure the surface shape of the formed layer 92. The control device 20 determines whether the machining operation for the formed layer 92 is needed based on the measurement result of the shape measurement unit 30. For example, when the surface roughness of the formed layer 92 is larger than a predetermined value, the control device 20 determines that the machining operation for the formed layer 92 is performed. However, the determination reference of the necessity of the machining operation for the formed layer 92 is not limited thereto. For example, the control device 20 may determine whether the machining operation for the formed layer 92 is needed based on the three-dimensional object design information and the formed layer forming condition. For example, when the surface roughness of the formed layer 92 calculated from the formed layer forming condition is larger than the necessary surface roughness based on the three-dimensional object design information, the control device 20 may determine that the machining operation for the formed layer 92 is needed.

When the control device 20 determines that the machining operation for the formed layer 92 is not needed (No in step S21), a process proceeds to step S24. When the control device 20 determines that the machining operation for the formed layer 92 is needed (Yes in step S21), the control device 20 determines a processing condition of the machining operation for the formed layer 92 (step S22). For example, the control device 20 determines the processing condition based on the measurement result of the shape measurement unit 30, or based on the three-dimensional object design information and the condition of forming the formed layer 92, or the like. After the control device 20 determines the formed layer processing condition, the control device 20 performs the machining operation for the formed layer 92 by the machining unit 13 based on the determined processing condition (step S23).

When the control device 20 performs the machining operation for the formed layer 92 or determines that the machining operation for the formed layer 92 is not needed, the control device determines whether to further deposit the formed layer 93 on the formed layer 92 (step S24). The control device 20 determines whether to further deposit the formed layer 93 on the formed layer 92 based on, for example, the three-dimensional object design information read from the storage unit 53.

When the control device 20 determines that the deposition of the formed layer 93 is needed (Yes in step S24), the process returns to step S18 and the formed layer 93 is deposited on the formed layer 92. When the control device 20 determines that the deposition of the formed layer 93 is not needed (No in step S24), the manufacture of the three-dimensional object is completed.

The three-dimensional deposition device 1 manufactures the three-dimensional object in this way. The three-dimensional deposition device 1 according to the embodiment manufactures the three-dimensional object by injecting the powder P through the deposition head 12 and irradiating the powder P with the laser beam L. Specifically, the three-dimensional deposition device 1 irradiates the laser beam L toward the powder P moving toward a target, melts the powder before the powder reaches the target, and adheres the molten body A to the target. Accordingly, it is possible to form the formed layer while decreasing the melting amount by the laser beam L or without melting the target. Accordingly, it is possible to reduce an influence of the laser beam with respect to the manufactured target or the formed layer and further deposit the solid body B on the manufactured target. From the description above, the three-dimensional deposition device 1 can manufacture the three-dimensional object with high accuracy.

Further, the three-dimensional deposition device 1 can perform an appropriate machining operation on the formed layer 92 by the machining unit 13. Thus, the three-dimensional deposition device 1 can manufacture the three-dimensional object with high accuracy. Further, in the above-described embodiment, it is possible to perform the machining operation with high accuracy by performing the machining operation to the formed layer 92 or the base unit 100 by the machining unit 13. However, the machining unit 13 may not be provided and the machining operation may not be performed.

Further, the base movement unit 36 moves the base unit 100 into the three-dimensional deposition chamber 2. There is a case where air is discharged in the three-dimensional deposition chamber 2. For example, even when the operator does not enter the three-dimensional deposition chamber 2, the base movement unit 36 can move the base unit 100 in the three-dimensional deposition chamber 2.

Figure 16:
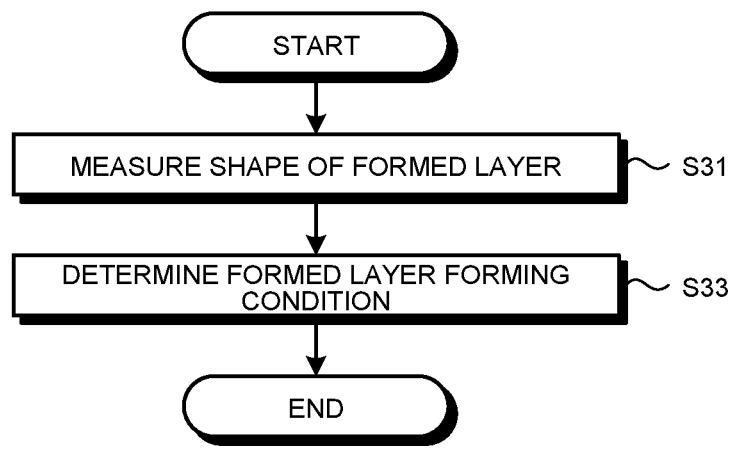
FIG. 16 is a flowchart illustrating an example of a step of determining a formed layer forming condition by the three-dimensional deposition device according to the embodiment.

Here, it is desirable that the three-dimensional deposition device 1 determine the formed layer forming condition by the shape measurement unit 30. FIG. 16 is a flowchart illustrating an example of a step of determining the formed layer forming condition by the three-dimensional deposition device 1 according to the embodiment. The process of FIG. 16 can be performed as a part of the process in step S18 of FIG. 15. The control device 20 measures a shape of the formed layer 92 by the shape measurement unit 30 (step S31). The control device 20 may measure the shape of the formed layer 92 by the shape measurement unit 30 while forming the formed layer 92 by the deposition head 12. The shape measurement unit 30 can measure both a shape of a position where the solid body B is to be formed by the deposition head 12 and a shape of the solid body B formed at that position. That is, the shape measurement unit 30 can measure a surface shape before and after the formed layer 92 is formed. After the control device 20 measures the shape of the formed layer 92, the control device 20 determines a condition of forming the formed layer 92 based on a measurement result of the shape measurement unit 30 (step S33).

The control device 20 determines a condition of forming the formed layer 92 in response to a surface shape measurement result of the formed layer 92 obtained by the shape measurement unit 30 and controls an operation of the deposition head 12. Thus, the three-dimensional deposition device 1 can further appropriately form the formed layer by setting a uniform distance between the formed layer forming position and the deposition head 12. Further, the three-dimensional deposition device 1 can measure the shape of the formed layer 92 by the shape measurement unit 30 while forming the formed layer by the deposition head 12. Thus, the three-dimensional deposition device 1 can further highly accurately manufacture the three-dimensional object based on the further appropriate formed layer forming condition. Here, in the above-described embodiment, the processing operation using the deposition head 12 has been described, but a processing operation using the machining unit 13 can be performed in the same way. Further, the formed layer forming condition determined in the above-described embodiment may be changed in accordance with a position or may be constant.

It is desirable that the three-dimensional deposition device 1 determine, as the formed layer forming condition, the movement path of the deposition head 12 that is, a relative relation between the movement of the table unit 11 and the Z-axis position of the deposition head 12 based on a detection result. Accordingly, it is possible to uniformly set the thickness of the deposited formed layer, the temperature of the solid part, and a deposition speed.

Figure 17:
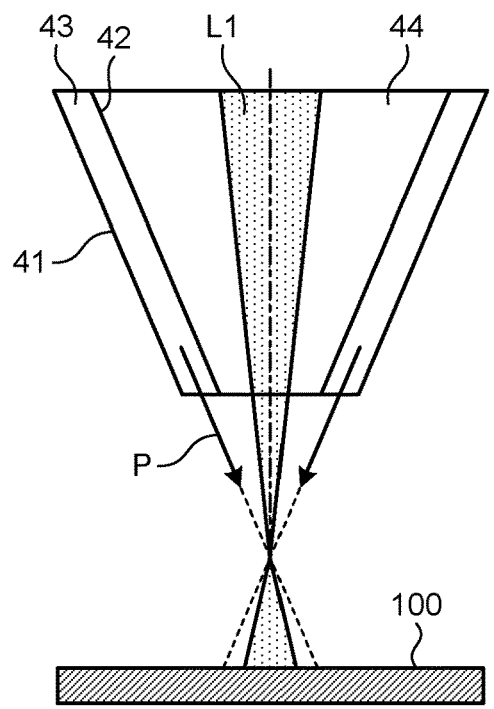
FIG. 17 is an explanatory diagram illustrating an example of the formed layer forming condition.
Figure 18:
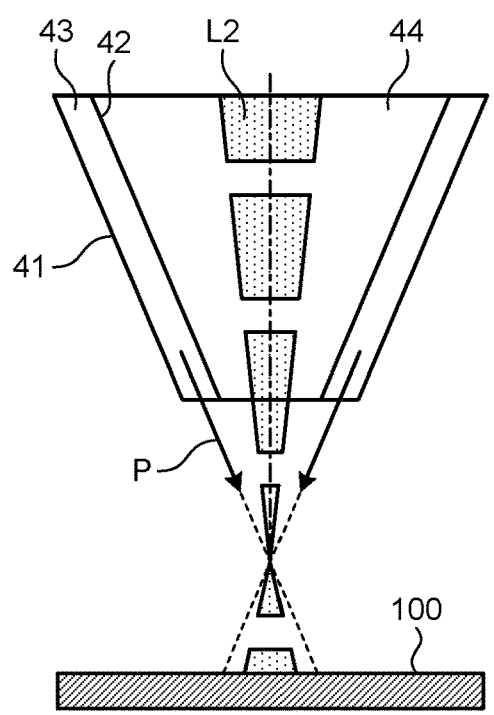
FIG. 18 is an explanatory diagram illustrating an example of the formed layer forming condition.

Here, the control device 20 may control the laser beam L emitted from the deposition head 12 as the formed layer forming condition. That is, an operation of the light irradiation unit of the deposition head 12 may be controlled. Hereinafter, an example of a control will be described with reference to FIGS. 17 to 22. FIGS. 17 and 18 are explanatory diagrams illustrating examples of the formed layer forming condition. FIGS. 17 and 18 illustrate examples of the emitted laser beam. The control device 20 may determine whether to output the laser beam L emitted from the deposition head 12 in the form of pulse waves or continuous waves as the formed layer forming condition. Specifically, a mode of emitting a laser beam L1 in the form of continuous waves as illustrated in FIG. 17 or a mode of emitting a laser beam L2 in the form of pulse waves as illustrated in FIG. 18 may be switched based on various detection results or set conditions. When the control device 20 sets the laser beam L2 in the form of pulse waves, the output of the laser per unit time can be decreased compared with the laser beam L1 in the form of continuous waves. Further, when the width (the duty ratio) of the pulse wave is adjusted, the output can be further adjusted. Accordingly, it is possible to adjust the laser beam in response to the supplied powder material or the materials of the base unit 100 and the pedestal 91 and thus to perform a further accurate processing operation.

Figure 19:
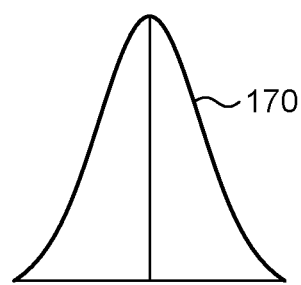
FIG. 19 is an explanatory diagram illustrating an example of the formed layer forming condition.
Figure 20:
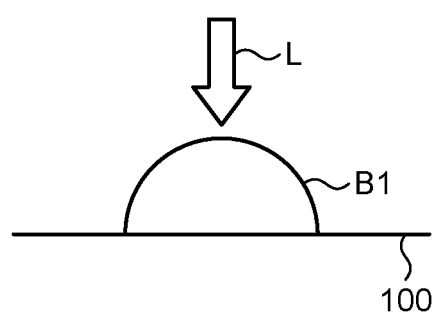
FIG. 20 is an explanatory diagram illustrating an example of the formed layer forming condition.
Figure 21:
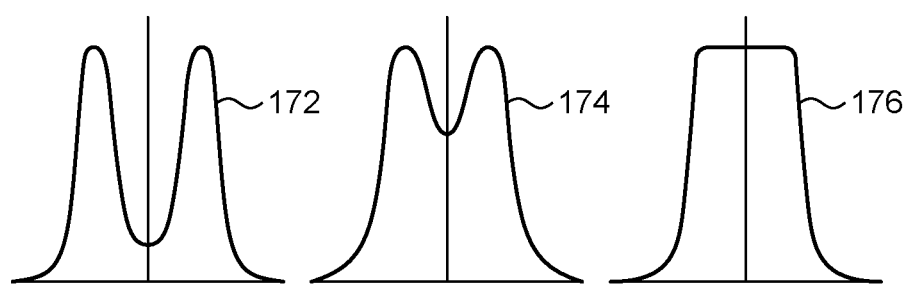
FIG. 21 is an explanatory diagram illustrating an example of the formed layer forming condition.
Figure 22:
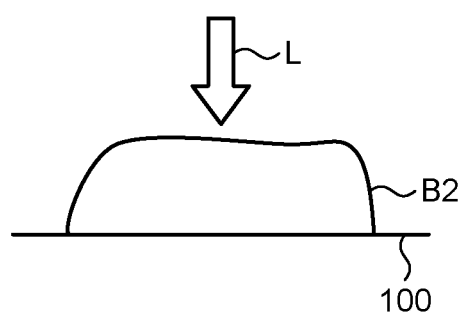
FIG. 22 is an explanatory diagram illustrating an example of the formed layer forming condition.

FIGS. 19 to 22 are explanatory diagrams illustrating examples of the formed layer forming condition. FIG. 19 illustrates an example of an output distribution of the laser beam and FIG. 20 illustrates an example of a solid body formed by the output distribution of FIG. 19. The control device 20 may determine the output distribution of the laser beam L emitted from the deposition head 12 as the formed layer forming condition. The control device 20 may determine whether to emit a laser beam having a Gaussian type output distribution 170 illustrated in FIG. 19, laser beams having caldera type output distributions 172 and 174 of which an output in the vicinity of a center is lower than that of the periphery as illustrated in FIG. 21, or a laser beam having a top hat type output distribution 176 of which an output toward a center is constant. The control device 20 can form a spherical solid body B1 as illustrated in FIG. 20 by using, for example, the laser beam having the output distribution 170 illustrated in FIG. 19. Further, the control device 20 can form a flat solid body B2 as illustrated in FIG. 22 by using, for example, the laser beam having the output distribution 176 illustrated in FIG. 21. Accordingly, the three-dimensional deposition device 1 can form the formed layer with higher accuracy by determining, for example, the thickness or the width of the formed layer to be formed or the output distribution of the laser beam.

Figure 23:
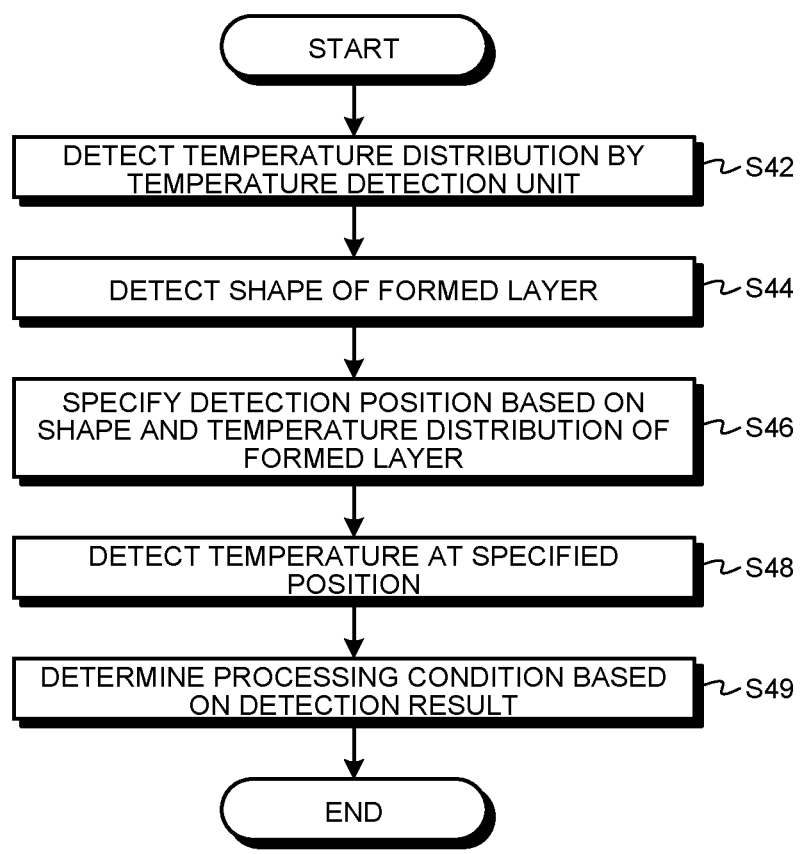
FIG. 23 is a flowchart illustrating an example of a step of determining the formed layer forming condition.

The three-dimensional deposition device 1 may determine a process operation based on a temperature distribution detected by the temperature detection unit 120. FIG. 23 is a flowchart illustrating an example of a step of determining the formed layer forming condition. The control device 20 detects a temperature distribution in the surface of the formed layer by the temperature detection unit 120 (step S42). The control device 20 can detect a temperature distribution in an entire area of the surface of the formed layer by the measurement of the temperature detection unit 120 while the base unit 100 is moved by the table unit 11. The control device 20 may perform the measurement before the processing operation is performed by the deposition head 12 or may perform the measurement while the processing operation is performed by the deposition head 12.

After the control device 20 detects a temperature distribution, the control device 20 detects a formed layer shape (a surface shape) by the shape measurement unit 30 (step S44). The surface shape and the temperature distribution in the formed layer may be detected at the same time.

After the control device 20 detects a shape of the formed layer, the control device 20 specifies a detection position for detecting a temperature by the temperature detection unit based on the shape and the temperature distribution of the formed layer (step S46) and then detects a temperature at the specified position (step S48). The control device 20 determines a processing condition based on the detected temperature (step S49) and ends the step.

Since the three-dimensional deposition device 1 measures a temperature at a specific position, for example, a position which is not easily cooled or easily warmed and determines the processing condition (the forming condition), a further appropriate processing operation can be performed.

Further, the three-dimensional deposition device 1 can uniformly set the thickness of the deposited formed layer, the temperature of the solid part, and a deposition speed by determining a movement path of the deposition head 12, that is, a processing condition including a temperature distribution based on a temperature distribution and a shape. That is, a further uniform processing operation can be performed with the processing condition determined based on the position which is not easily cooled and easily warmed.

Here, it is desirable that the three-dimensional deposition device 1 rotate the temperature detection unit 120 and the heating head 31 about the Z axis with respect to the deposition head 12. Accordingly, it is possible to uniformly set or change the relative positions the deposition head 12, the temperature detection unit 120, and the heating head 31 in response to the movement direction of the table unit 11. Further, the three-dimensional deposition device 1 may have a configuration in which the temperature detection unit 120 and the heating head 31 are provided at two positions with respect to the deposition head 12 and the deposition head 12 is interposed therebetween.

Further, the three-dimensional deposition device 1 may determine a process operation by using a detection result of the weight detection unit 130. For example, the three-dimensional deposition object may be evaluated by a change in weight caused by the formed object. Specifically, the density of the three-dimensional deposition object can be calculated by a change in size and weight and thus a void formed in the three-dimensional deposition object can be detected. Further, the three-dimensional deposition device 1 can detect a foreign matter attached to the base unit 100, that is, an unmelted powder material or chips produced during a processing operation of the machining unit 13 based on the weight of the weight detection unit 130. Accordingly, this measurement result can be used to control the operation of the powder collection unit 39.

Figure 24:
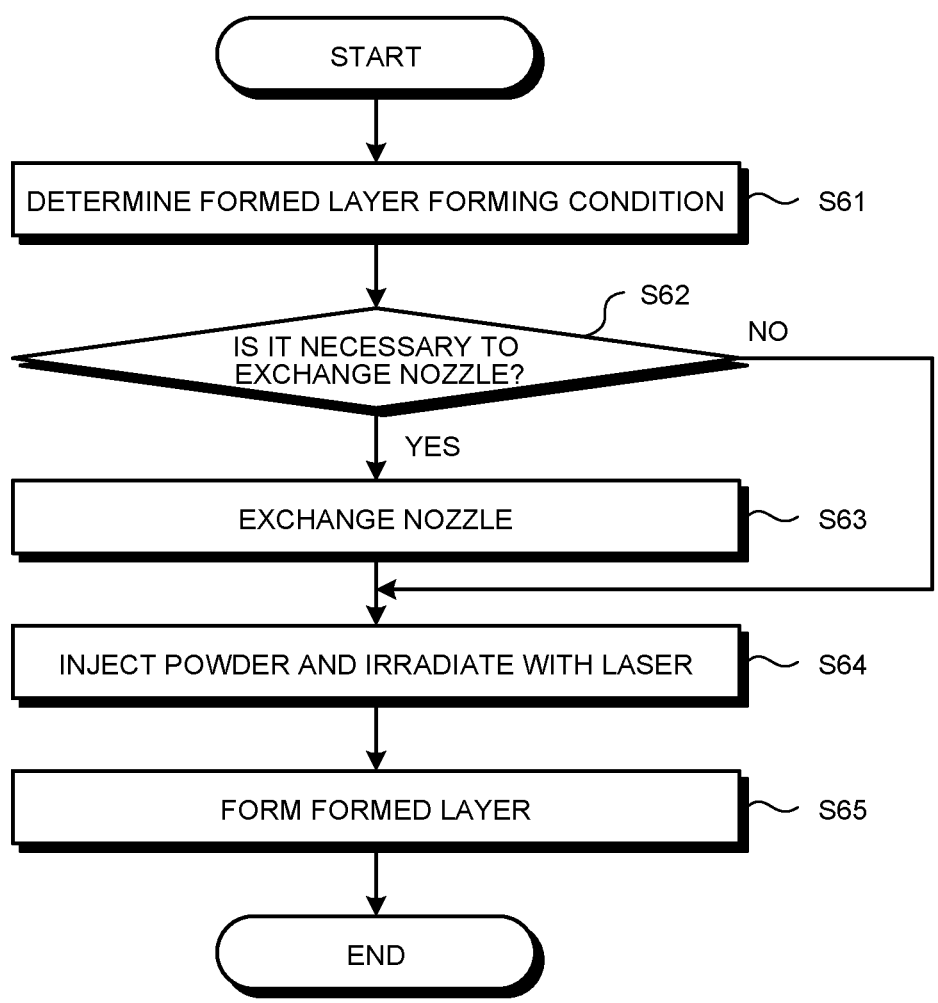
FIG. 24 is a flowchart illustrating an example of a step of exchanging the front end of the deposition head by the three-dimensional deposition device according to the embodiment.

Further, the three-dimensional deposition device 1 can further include a step of exchanging the nozzle 23 of the deposition head 12 by the nozzle exchange unit 34. FIG. 24 is a flowchart illustrating an example of a step of exchanging the nozzle 23 of the deposition head 12 in the three-dimensional deposition device 1 according to the embodiment. First, the control device 20 determines a condition of forming the formed layer 92 (step S61). The determination of the processing condition in step S61 is performed by, for example, the same determination method for the condition of forming the formed layer 92 in step S18 of FIG. 15.

When the control device 20 determine the forming condition, the control device determines whether to exchange the nozzle 23 of the deposition head 12 based on the determined condition of forming the formed layer 92 (step S62). For example, when the determined condition of forming the formed layer 92 is to improve the accuracy of forming the formed layer 92, the control device 20 determines that the tool 22 of the machining unit 13 needs to be exchanged with a tool emitting the laser beam L to have a small spot diameter or a tool injecting the powder P to have a small convergence diameter. However, the determination condition on whether to exchange the nozzle 23 of the deposition head 12 is not limited thereto.

When the control device 20 determines that the nozzle 23 of the deposition head 12 needs to be exchanged (Yes in step S62), the nozzle 23 of the deposition head 12 is exchanged by the nozzle exchange unit 34 (step S63).

After the nozzle 23 of the deposition head 12 is exchanged, the control device 20 injects the powder P and emits the laser beam L by the deposition head 12 having an exchanged nozzle (step S64). In this way, the formed layer 92 is formed (step S65) and the step ends. When the control device 20 determines that the nozzle 23 of the deposition head 12 does not need to be exchanged (No in step S62), the control device 20 injects the powder P and emits the laser beam L by the deposition head 12 having the same nozzle (step S64). In this way, the formed layer 92 is formed (step S65) and the step ends.

In this way, the three-dimensional deposition device 1 can exchange the nozzle 23 of the deposition head 12 based on the condition of forming the formed layer 92 determined by the nozzle exchange unit 34. Thus, the three-dimensional deposition device 1 according to the embodiment can further appropriately or easily form the formed layer 92. Here, in the above-described embodiment, a case of exchanging the nozzle has been described, but the tool can be also exchanged in this way.

Figure 25:
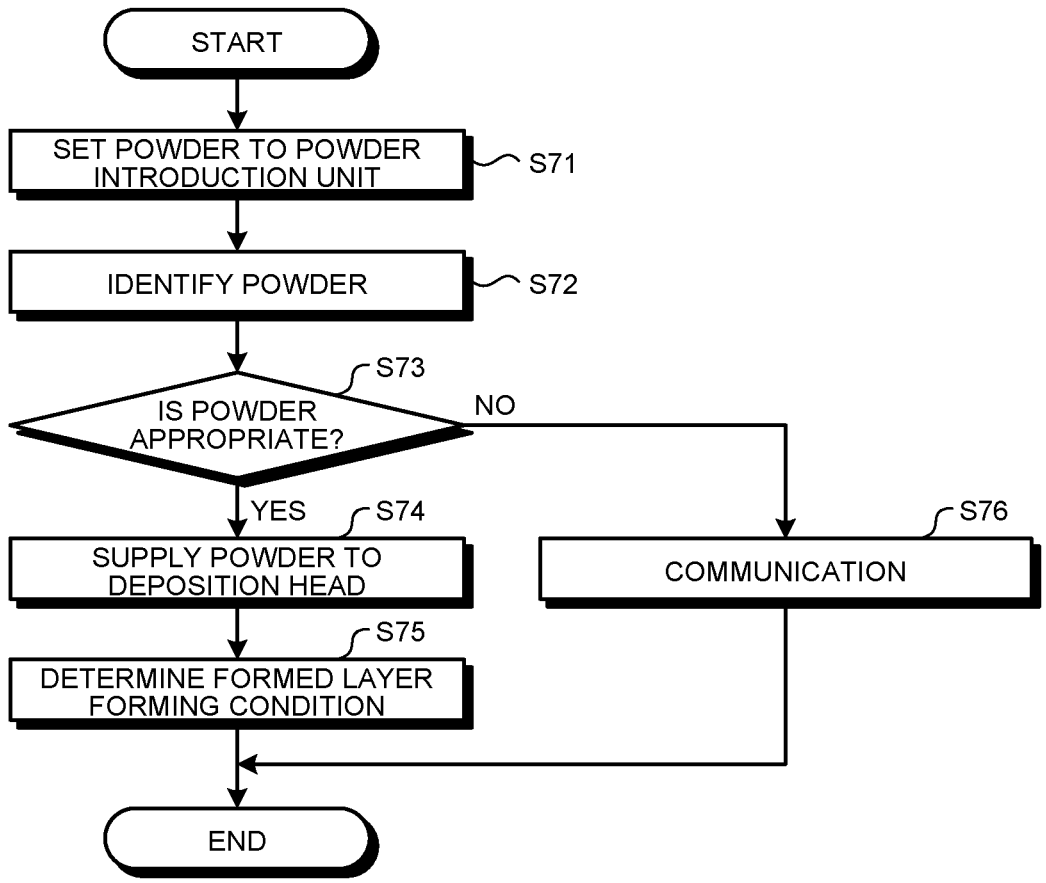
FIG. 25 is a flowchart illustrating an example of a step of identifying powder by the three-dimensional deposition device according to the embodiment.

Further, the three-dimensional deposition device 1 can further include a step of identifying the powder introduced into the deposition head 12 by the powder introduction unit 35. FIG. 25 is a flowchart illustrating an example of the step of identifying the powder by the three-dimensional deposition device 1 according to the embodiment. The control device 20 detects a state where the powder is set to the powder introduction unit 35 (step S71). For example, the control device detects a state where the cartridge 83 having the powder received therein is stored in the powder storage unit 81.

After the powder is set, the control device 20 identifies the powder by the powder identification unit 82 of the powder introduction unit 35 (step S72). For example, the control device 20 reads the material display part 84 of the cartridge 83 by the powder identification unit 82 of the powder introduction unit 35. The control device 20 then detects the powder information necessary for manufacturing the three-dimensional object such as a type, a particle size, a weight, and purity of powder or an oxygen content of powder. The control device 20 may identify the powder inside the powder introduction unit 35A by the powder identification unit 82A of the powder introduction unit 35A.

After the control device 20 identifies the powder, the control device 20 determines whether the powder inside the powder introduction unit 35 is appropriate based on the powder identification result (step S73). The control device 20 determines whether the powder inside the powder introduction unit 35 is appropriate based on, for example, the three-dimensional object design information. For example, when the powder inside the powder introduction unit 35 is not appropriate to manufacture the three-dimensional object, the control device 20 determines that the powder inside the powder introduction unit 35 is not appropriate.

When the control device 20 determines that the powder is appropriate (Yes in step S73), the control device 20 introduces the powder from the powder introduction unit 35 to the deposition head 12 (step S74).

Next, the control device 20 determines the condition of forming the formed layer 92 based on the powder information identified in step S72 (step S75) and the step ends. Here, there is a case in which the deposition head 12 injects, for example, different types of powder in a mixed state. In this case, the control device 20 determines the condition of forming the formed layer 92 based on an instruction of injecting different types of powder in a mixed state. Here, the condition of forming the formed layer 92 is a condition necessary to form the formed layer similarly to step S18 of FIG. 15 and includes, for example, a shape of each formed layer, a type of powder, an injection speed of the powder P, an injection pressure of the powder P, an irradiation condition of the laser beam L, a temperature of the molten body A, a cooling temperature of the solid body B, or a movement speed of the base unit 100 using the table unit 11.

When the control device 20 determines that the powder is not appropriate (No in step S73), the control device 20 transmits information telling the powder is inappropriate or inappropriate powder information to an external data server via the communication unit 55 (step S76) and the step ends. In this case, the control device 20 does not generate an instruction of introducing the powder from the powder introduction unit 35 into the deposition head 12 and the step ends. That is, the three-dimensional deposition device 1 stops the supply of the powder to the deposition head 12 when it determines that the powder is not appropriate.

In this way, the control device 20 controls the introduction of the powder from the powder introduction unit 35 to the deposition head 12 in response to the powder identification result of the powder introduction unit 35. When the powder is not appropriate, there is a possibility that the quality of the manufactured three-dimensional object is deteriorated. Further, when the inappropriate powder is irradiated with the laser beam L, the possibility of safety involving with ignition may be decreased. The powder introduction unit 35 introduces the powder into the deposition head 12 only when the powder is appropriate. Thus, the three-dimensional deposition device 1 according to the embodiment can suppress deterioration in quality of the three-dimensional object or deterioration in safety.

Further, when the control device determines that the powder is not appropriate, the control device 20 can transmit information telling the powder is inappropriate or inappropriate powder information to an external data server. Since the external data server stores such information, the powder which is used in the three-dimensional deposition device 1 can be further appropriate. Thus, the three-dimensional deposition device 1 according to the embodiment can improve the quality of the three-dimensional object.

Further, the control device 20 determines the condition of forming the formed layer 92 in response to the powder identification result obtained by the powder introduction unit 35 and controls the operation of the deposition head 12. Thus, the three-dimensional deposition device 1 according to the embodiment can further appropriately form the formed layer 92.

Figure 26:
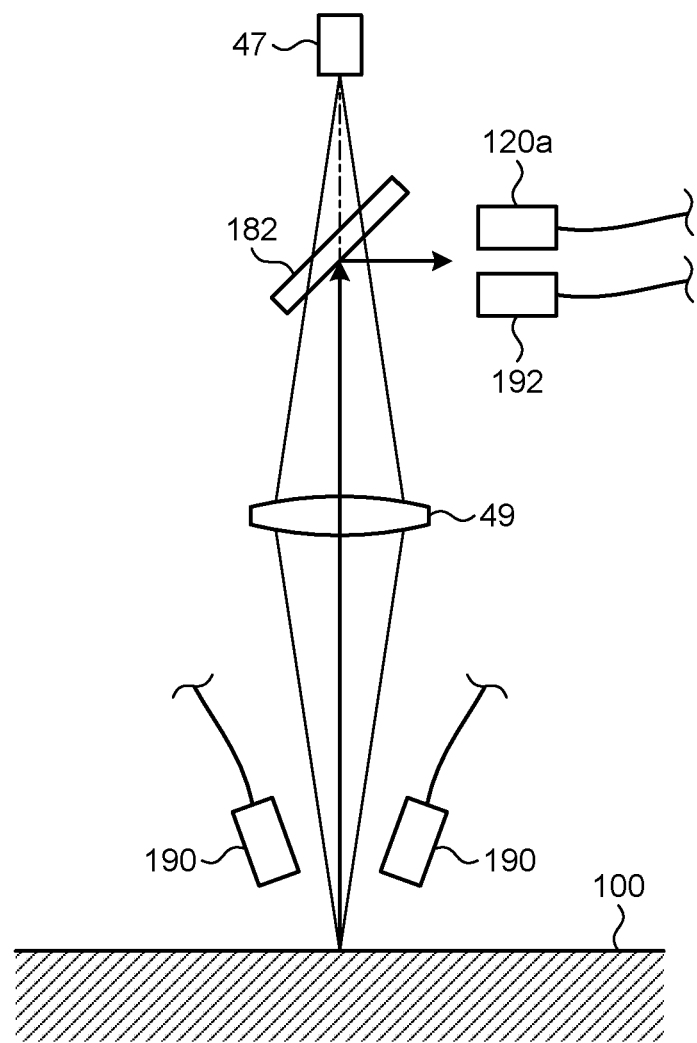
FIG. 26 is a schematic diagram illustrating another example of the periphery of the deposition head of the three-dimensional deposition device.

The three-dimensional deposition device may further include another detection unit that detects a parameter for controlling a forming condition. FIG. 26 is a schematic diagram illustrating another example of the periphery of the deposition head of the three-dimensional deposition device. The three-dimensional deposition device illustrated in FIG. 26 includes a temperature detection sensor 120a, a half mirror 182, a plasma emission detection unit 190, and a reflected light detection unit 192 in the periphery of the laser beam path of the deposition head. The half mirror 182 is disposed between the light source 47 and the light concentrating unit 49. The half mirror 182 causes the laser beam directed from the light source 47 toward the light concentrating unit 49 to be transmitted therethrough and reflects the laser beam directed from the light concentrating unit 49 toward the light source 47. That is, the half mirror 182 reflects the laser beam reflected by the base unit 100 or the formed layer in a predetermined direction.

The plasma emission detection unit 190 detects plasma generated by the irradiation of the laser beam L to the base unit 100 or the formed layer. The reflected light detection unit 192 detects the laser beam reflected by the half mirror 182. Further, the temperature detection unit 120a detects a temperature based on a condition at the position of the laser beam reflected by the mirror 182.

Figure 27:
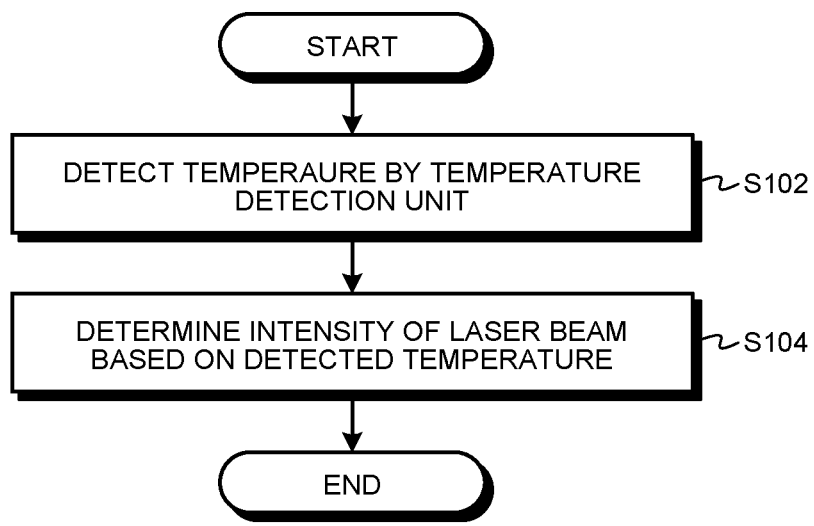
FIG. 27 is a flowchart illustrating an example of a step of determining the formed layer forming condition.

Next, an example of a control which is performed by components will be described with reference to FIGS. 27 to 29. FIG. 27 is a flowchart illustrating an example of a step of determining a formed layer forming condition. The control device 20 detects a temperature by the temperature detection unit 120a (step S102), determines the intensity of the laser beam based on the detected temperature (result) (step S104), and ends the step. When the control device 20 determines the output of the laser beam based on the result detected by the temperature detection unit 120a, it is possible to further uniformly set the temperature of the formed layer and to perform a highly accurate processing operation.

Figure 28:
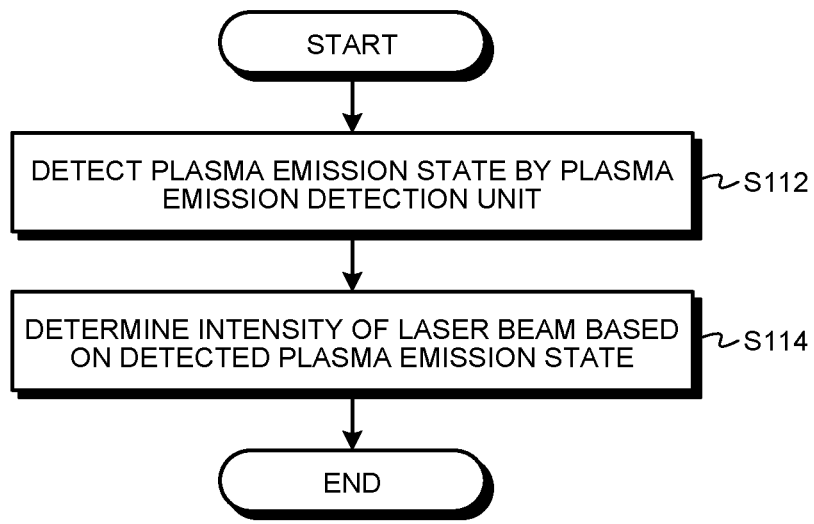
FIG. 28 is a flowchart illustrating an example of a step of determining the formed layer forming condition.

FIG. 28 is a flowchart illustrating an example of a step of determining the formed layer forming condition. The control device 20 detects a plasma emission state by the plasma emission detection unit 190 (step S112), determines the intensity of the laser beam based on the detected plasma emission state (step S114), and ends the step. Even when the control device 20 determines the output of the laser beam based on the result detected by the plasma emission detection unit 190, it is possible to further uniformly set the temperature of the formed layer and to perform a highly accurate processing operation. Here, the control device 20 can monitor the temperature of the focal position of the laser by detecting the plasma emission state by the plasma emission detection unit 190. Since plasma generated when the injected powder is melted by a laser beam emitted thereto is detected, a powder melted state in the gas can be monitored.

Figure 29:
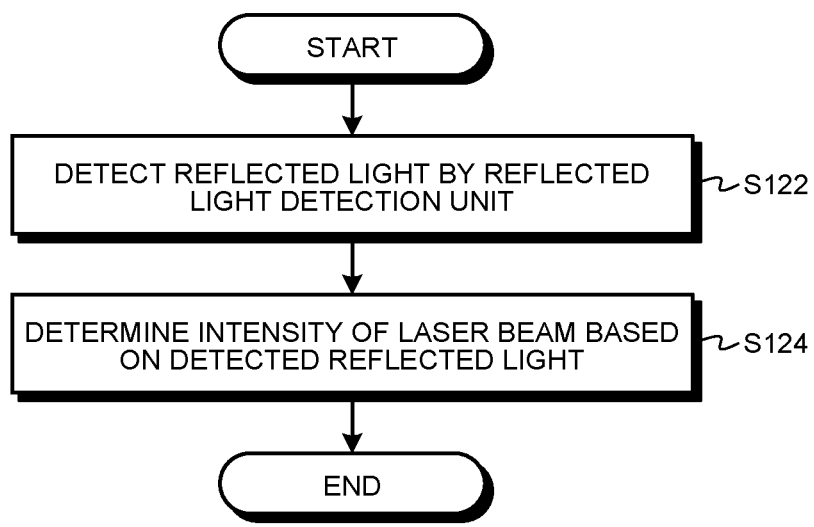
FIG. 29 is a flowchart illustrating an example of a step of determining the formed layer forming condition.

FIG. 29 is a flowchart illustrating an example of a step of determining the formed layer forming condition. The control device 20 detects reflected light by the reflected light detection unit 192 (step S122), determines the intensity of the laser beam based on the detected reflected light (step S124), and ends the process. Even when the control device 20 determines the output of the laser beam based on the result detected by the reflected light detection unit 192, it is possible to further uniformly set the temperature of the formed layer and to perform a highly accurate processing operation. Here, the control device 20 can monitor a temperature at a position to which the molten body A is adhered by detecting the reflected light through the reflected light detection unit 192. Further, in FIGS. 27 to 29, the output of the laser beam is determined based on the measured result. However, a configuration may be employed in which the focal position of the laser beam is determined and the focal position is adjusted to the determined focal position. In this case, the deposition head 13 may be moved or only a focal position P1 of the laser beam L may be changed by the focal position adjustment unit 140 to adjust a relative position with respect to a position P2 to which the powder material is injected.

Figure 30:
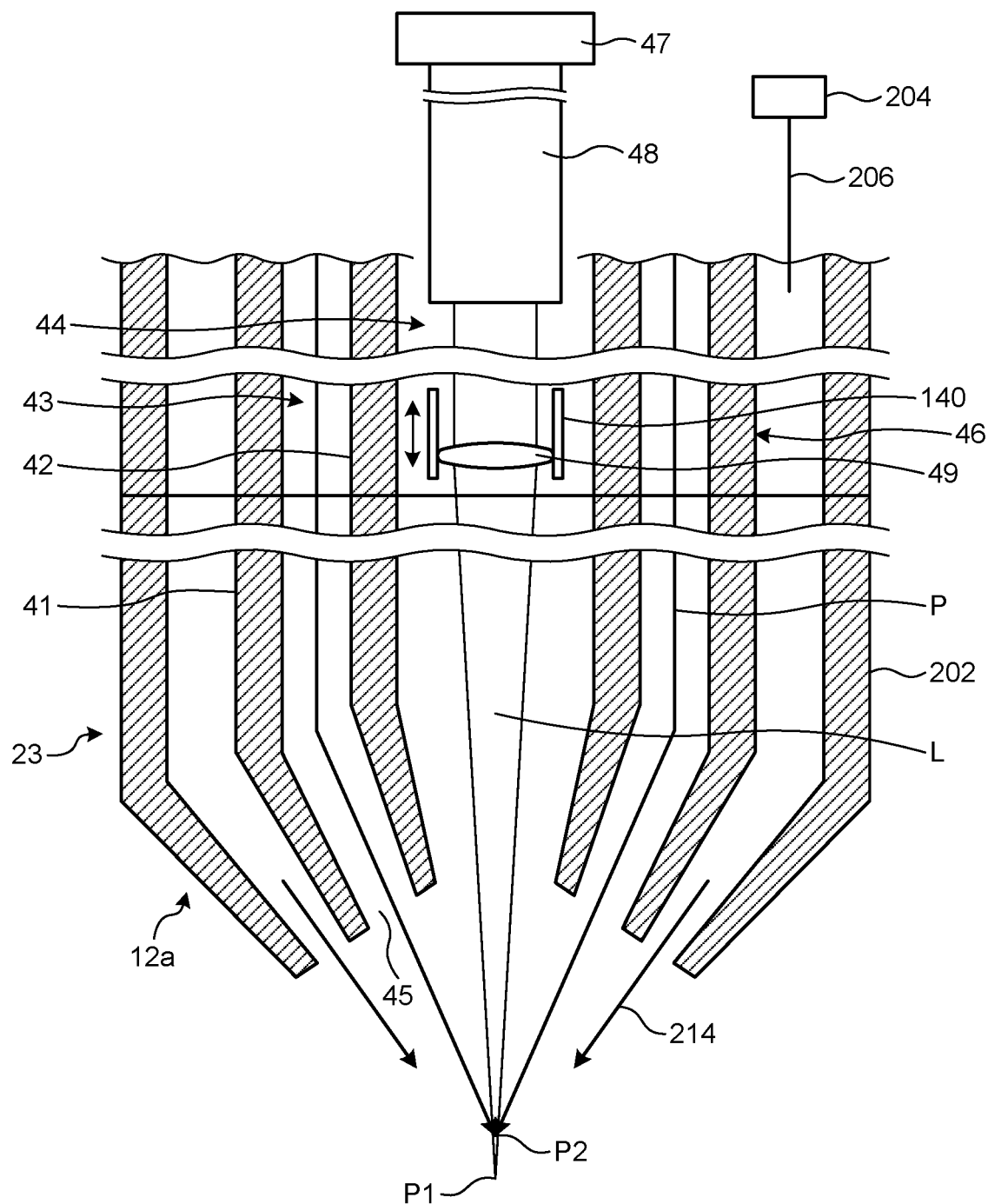
FIG. 30 is a schematic diagram illustrating another example of the deposition head.

FIG. 30 is a schematic diagram illustrating another example of the deposition head. A deposition head 12*a* illustrated in FIG. 30 is formed so that a tube passage 202 is disposed outside the outer tube 41. A passage is formed between the tube passage 202 and the outer tube 41. A purge gas supply unit 204 is connected to the passage through a purge gas supply tube 206. The deposition head 12*a* has a configuration in which the tube passage 202 is provided outside the powder passage 43 to form a triple nozzle. Since the deposition head 12*a* supply a purge gas 214 from the outside of the powder passage 43, it is possible to suppress the dispersion of the powder supplied from the powder passage 43 and thus to appropriately inject the powder material to a desired position.

Figure 31:
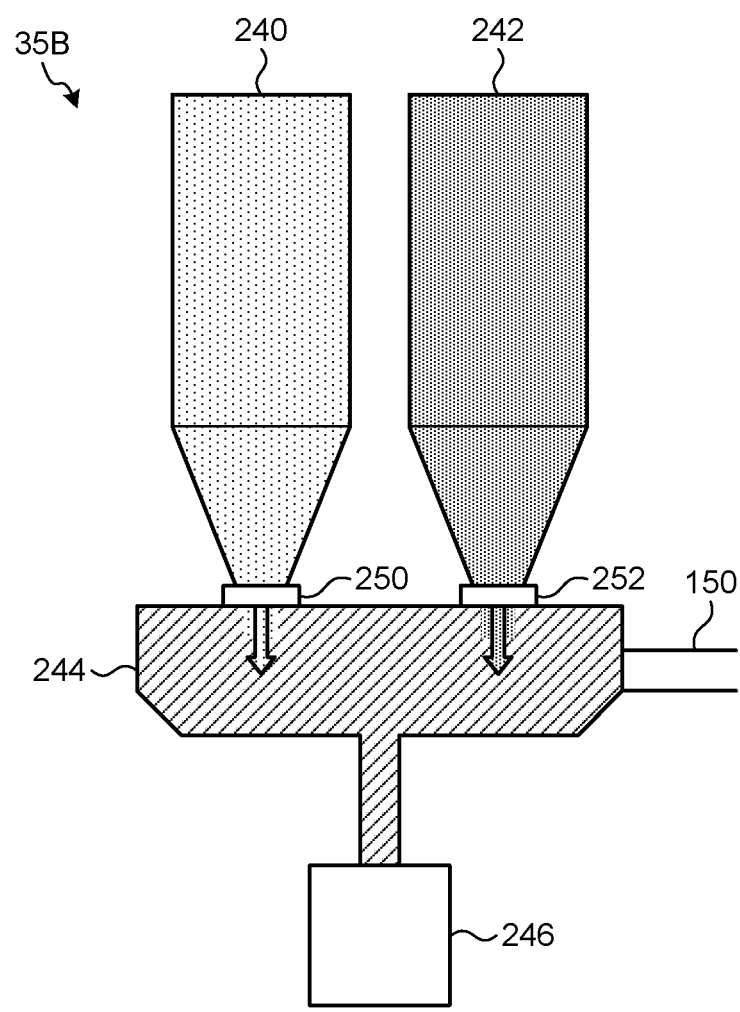
FIG. 31 is a schematic diagram illustrating an example of the powder introduction unit.

Further, it is desirable that the three-dimensional deposition device introduce a plurality of types of powder from the powder introduction unit. FIG. 31 is a schematic diagram illustrating an example of the powder introduction unit. A powder introduction unit 35B illustrated in FIG. 31 includes powder storage units 240 and 242, a buffer 244, a carrying gas supply unit 246, and valves 250 and 252. Two powder storage units 240 and the powder storage unit 242 respectively store different types of powder. The powder storage units 240 and 242 have the same functions as those of the above-described powder storage units 81 and 81A. The buffer 244 temporarily stores the powder supplied from the powder storage units 240 and 242. The buffer 244 is connected to a powder supply tube 150. The carrying gas supply unit 246 supplies air for carrying the powder to the buffer 244. The valve 250 is disposed between the powder storage unit 240 and the buffer 244 and switches a state where the powder is supplied from the powder storage unit 240 to the buffer 244 or a state where the supply is stopped by switching an opening/closing state. The valve 252 is disposed between the powder storage unit 242 and the buffer 244 and switches a state where the powder is supplied from the powder storage unit 242 to the buffer 244 or versa state where the supply is stopped by switching an opening/closing state.

The powder introduction unit 35B has the above-described configuration and can control the type of powder supplied to the buffer 244 by switching the opening/closing states of the valves 250 and 252. The powder supplied to the buffer 244 is carried to the powder supply tube 150 along with the carrying gas supplied from the carrying gas supply unit 246 and is supplied to the deposition head 12. The powder introduction unit 35B can supply two types of powder.

Figure 32:
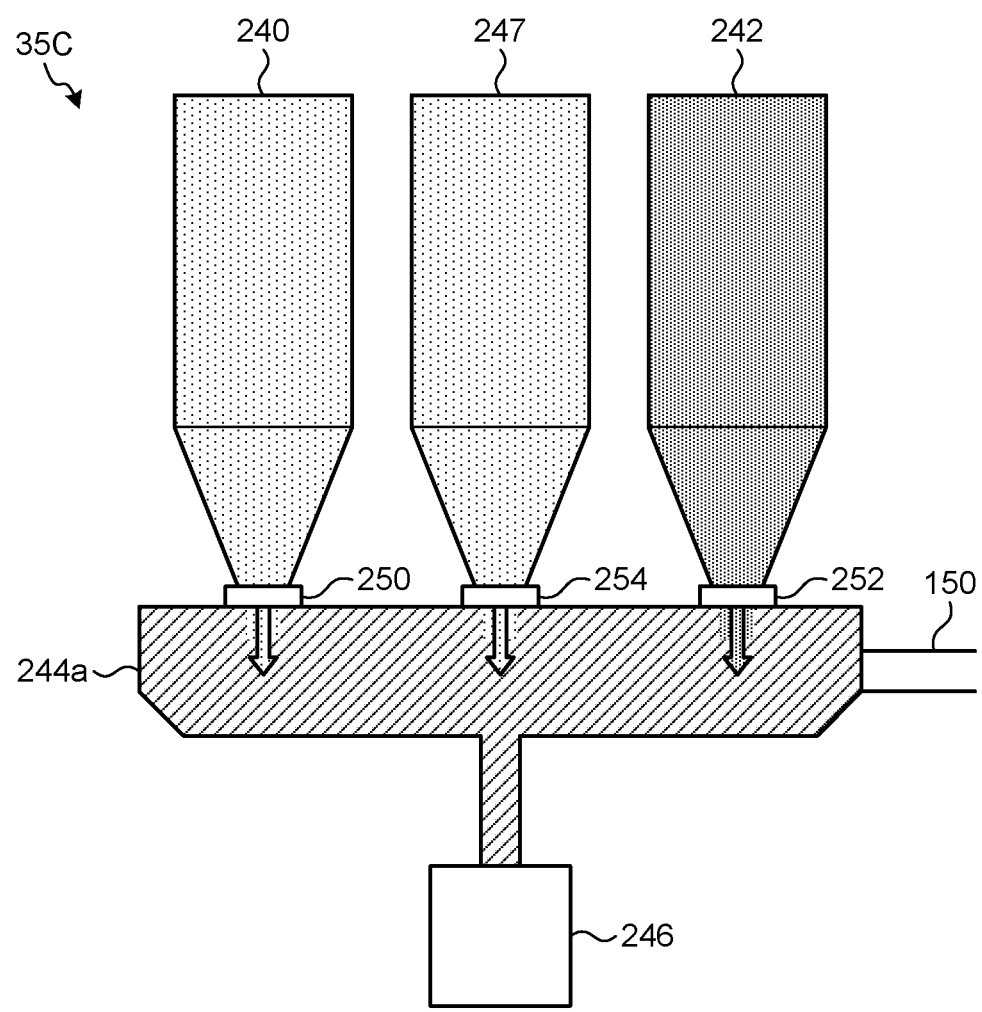
FIG. 32 is a schematic diagram illustrating an example of the powder introduction unit.

FIG. 32 is a schematic diagram illustrating an example of the powder introduction unit. A powder introduction unit 35C illustrated in FIG. 32 includes powder storage units 240, 242, and 247, a buffer 244*a*, a carrying gas supply unit 246, and valves 250, 252, and 254. Three powder storage units 240, the powder storage unit 242, and the powder storage unit 244 respectively store different types of powder. Intermediate powder which is stored in the powder storage unit 247 is a material which has affinity with first powder stored in the powder storage unit 240 and second powder stored in the powder storage unit 242. The powder storage units 240, 242, and 247 have the same functions as those of the above-described powder storage units 81 and 81A. The buffer 244*a* temporarily stores the powder supplied from the powder storage units 240, 242, and 247. The buffer 244*a* is connected to the powder supply tube 150. The carrying gas supply unit 246 supplies air for carrying the powder to the buffer 244*a*. The valve 250 is disposed between the powder storage unit 240 and the buffer 244*a* and switches a state where the powder is supplied from the powder storage unit 240 to the buffer 244*a* or versa state where the supply is stopped by switching an opening/closing state. The valve 252 is disposed between the powder storage unit 242 and the buffer 244*a* and switches a state where the powder is supplied from the powder storage unit 242 to the buffer 244*a* or versa state where the supply is stopped by switching an opening/closing state. The valve 254 is disposed between the powder storage unit 247 and the buffer 244*a* and switches a state where the powder is supplied from the powder storage unit 247 to the buffer 244*a* or versa state where the supply is stopped by switching an opening/closing state.

The powder introduction unit 35C has the above-described configuration and can control the type of powder supplied to the buffer 244*a* within three types by switching the opening/closing states of the valves 250, 252, and 254. The powder supplied to the buffer 244*a* is carried to the powder supply tube 150 along with the carrying gas supplied from the carrying gas supply unit 246 and is supplied to the deposition head 12. Additionally, the type of powder supplied from the powder introduction unit is not limited to two types and three types, but may be four types or more. Further, the powder introduction unit can check the type and the property of the supplied powder by identifying the powder at the powder identification unit.

Figure 33:
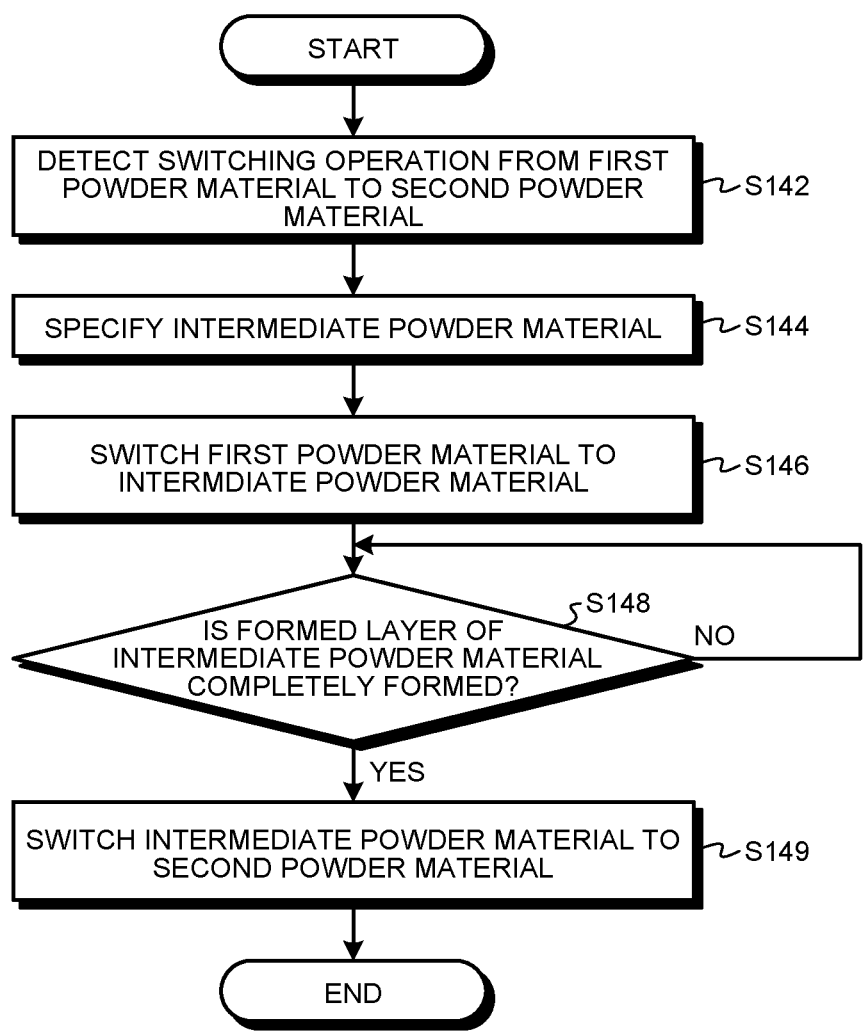
FIG. 33 is a flowchart illustrating an example of a process operation of the three-dimensional deposition device.
Figure 34:
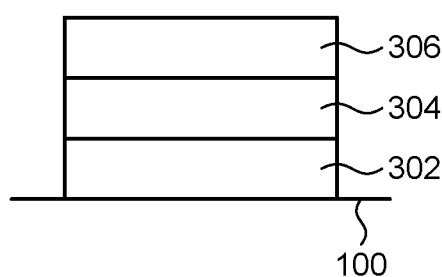
FIG. 34 is an explanatory diagram illustrating an example of a formed layer manufactured by the three-dimensional deposition device.

FIG. 33 is a flowchart illustrating an example of a process operation of the three-dimensional deposition device. FIG. 34 is an explanatory diagram illustrating an example of the formed layer manufactured by the three-dimensional deposition device. FIGS. 33 and 34 are examples of a process operation using the powder introduction unit 35C. When the control device 20 detects an instruction of switching the powder supplied from the powder introduction unit 35C from the first powder material to the second powder material (step S142), the intermediate powder material is specified (step S144). The intermediate powder material is powder which has high affinity, that is, easily attached and adhered to both two powder materials. For example, when the control device detects an instruction of switching the powder material from the powder of the powder storage unit 240 to the powder of the powder storage unit 242, the powder of the powder storage unit 247 is specified as the intermediate powder.

When the intermediate powder material is specified, the control device 20 switches the powder material supplied to the deposition head 12 from the first powder material to the intermediate powder material (step S146). When the control device 20 switched to the intermediate powder material, the control device 20 determines whether the forming of the formed layer with the intermediate powder material is completed (step S148). When the control device 20 determines that the forming of the formed layer with the intermediate powder material is not completed (No in step S148), the process returns to step S148. That is, the control device 20 continuously supplies the intermediate powder material until the formed layer of the intermediate powder material is completed to be formed and repeats the process in step S148.

When the control device 20 determines that the forming of the formed layer with the intermediate powder material is completed (Yes in step S148), the powder material supplied to the deposition head 12 is switched from the intermediate powder material to the second powder material (step S149) and the process ends. The control device 20 performs a process in FIG. 33 and switches the powder material in order of the first powder material, the intermediate powder material, and the second powder material. Thus, as illustrated in FIG. 34, a formed layer 302 of the first powder material, a formed layer 304 of the intermediate powder material, and a formed layer 306 of the second powder material can be deposited sequentially. Accordingly, since the adhesion between the formed layers can be increased even when different types of powder are deposited, a three-dimensional structure can be formed with high accuracy.

Figure 35:
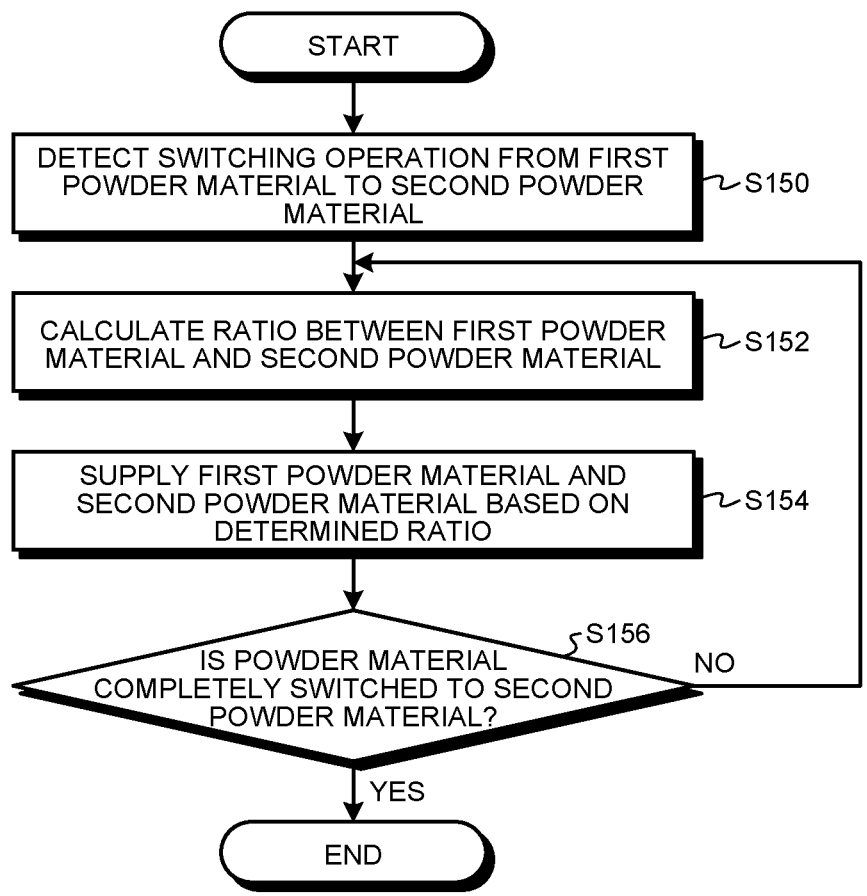
FIG. 35 is a flowchart illustrating an example of a process operation of the three-dimensional deposition device.
Figure 36:
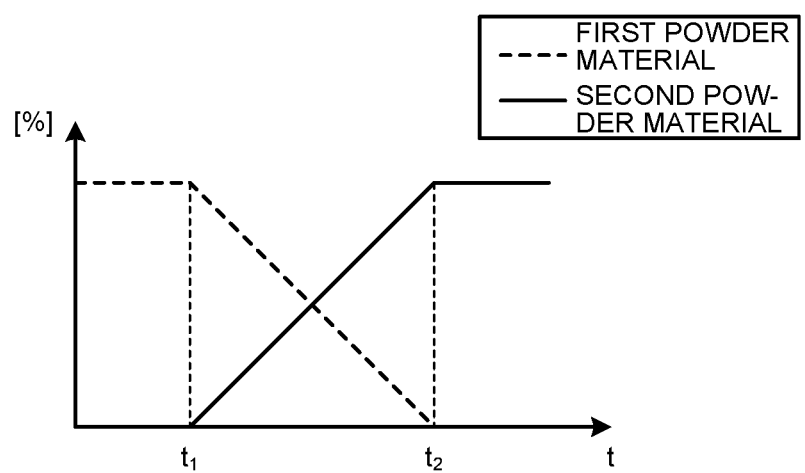
FIG. 36 is a graph illustrating an example of a relation used to determine a balance of a powder material.
Figure 37:
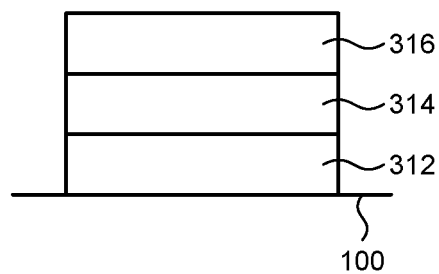
FIG. 37 is an explanatory diagram illustrating an example of the formed layer manufactured by the three-dimensional deposition device.

FIG. 35 is a flowchart illustrating an example of a process operation of the three-dimensional deposition device. FIG. 36 is a graph illustrating an example of a relation used to determine a balance of the powder material. FIG. 37 is an explanatory diagram illustrating an example of the formed layer manufactured by the three-dimensional deposition device. FIGS. 35 to 37 are examples of the process operation using the powder introduction unit 35B. When the control device 20 detects an instruction of switching the powder supplied from the powder introduction unit 35B from the first powder material to the second powder material (step S150), a ratio between the first powder material and the second powder material is calculated (step S152). Here, as illustrated in FIG. 36, the control device 20 sets a relation in which the ratio between the first powder material and the second powder material changes in response to time. Specifically, the ratio of the first powder material decreases and the ratio of the second powder material increases as the time changes from the time t1 to the time t2. Then, the ratio of the first powder material becomes 0 and the ratio of the second powder material becomes 100 at the time t2.

When the control device 20 determines the ratio, the first powder material and the second powder material are supplied based on the determined ratio (step S154). After the first powder material and the second powder material are supplied, the control device 20 determines whether the second powder material is completely selected, that is, the powder material supplied to the deposition head 12 is completely switched from the first powder material to the second powder material by 100% (step S156). When the control device 20 determines that the switching operation is not completely performed (No in step S156), the routine returns to step S152. That is, the control device 20 repeats the processes from step S152 to step S156 until the switching operation is completed.

When the control device 20 determines that a change is completed (Yes in step S156), the process ends. The control device 20 performs a process in FIG. 35 and switches the supplied powder material from the first powder material to the second powder material while changing the ratio between the first powder material and the second powder material. Thus, as illustrated in FIG. 37, a formed layer 312 of the first powder material, an intermediate formed layer 314 in which the ratio of the powder materials gradually changes from a large amount of the first powder material to a large amount of the second powder material, and a formed layer 316 of the second powder material can be deposited in this order. When the intermediate formed layer 314 is provided in this way, the adhesion between the formed layers can be increased and thus a three-dimensional structure can be formed with high accuracy.

While the embodiments of the invention have been described, the embodiments are not limited to the content of these embodiments. Further, the above-described components include a component which is easily supposed by the person skilled in the art, a component which has substantially the same configuration, and a component which is in a so-called equivalent scope. The above-described components can be appropriately combined with one another. Additionally, various omissions, substitutions, or modifications of the components can be made without departing from the spirit of the above-described embodiments. For example, the three-dimensional deposition device may have a configuration in which the control device 20 is connected to an external device via a communication line such as the Internet and a processing condition, for example, a formed layer forming condition is changed and set based on an instruction input from the external device. That is, the three-dimensional deposition device may change the processing condition from the external device by the communication using the communication line.

REFERENCE SIGNS LIST

1 THREE-DIMENSIONAL DEPOSITION DEVICE
2 THREE-DIMENSIONAL DEPOSITION CHAMBER
3 SPARE CHAMBER
4 DEPOSITION HEAD ACCOMMODATION CHAMBER
4a, 5a Z-AXIS SLIDE UNIT
5 MACHINING UNIT ACCOMMODATION CHAMBER
6, 7 DOOR
10 BED
11 TABLE UNIT
12 DEPOSITION HEAD
13 MACHINING UNIT
15 Y-AXIS SLIDE UNIT
16 X-AXIS SLIDE UNIT
17 ROTATION TABLE UNIT
18, 19 BELLOWS

20 CONTROL DEVICE
22 TOOL
23 NOZZLE
24 FRONT END
25 AIR DISCHARGE UNIT
30 SHAPE MEASUREMENT UNIT
31 HEATING HEAD
32 MACHINING MEASUREMENT UNIT
33 TOOL EXCHANGE UNIT
34 NOZZLE EXCHANGE UNIT
35, 35A POWDER INTRODUCTION UNIT
36 BASE MOVEMENT UNIT
37 AIR DISCHARGE UNIT
38 GAS INTRODUCTION UNIT
39 POWDER COLLECTION UNIT
41 OUTER TUBE
42 INNER TUBE
43 POWDER PASSAGE
44 LASER PATH
46 MAIN BODY
47 LIGHT SOURCE
48 OPTICAL FIBER
49 LIGHT CONCENTRATING UNIT
51 INPUT UNIT
52 CONTROLLER
53 STORAGE UNIT
54 OUTPUT UNIT
55 COMMUNICATION UNIT
56 FRONT END
57 LIGHT SOURCE UNIT
58 IMAGE CAPTURING UNIT
81, 81A POWDER STORAGE UNIT
82, 82A POWDER IDENTIFICATION UNIT
83 CARTRIDGE
84 MATERIAL DISPLAY PART
85 INTRODUCTION PART
86 CYCLONE PART
87 GAS DISCHARGE PART
88 POWDER DISCHARGE PART
91 PEDESTAL
92, 93 FORMED LAYER
95 DISC PART
96 THREADED HOLE PART
97 SHAFT PART
98 TRUNCATED CONICAL PART
99 MEMBER
100 BASE UNIT
102, 104, 106, 108 ARROW
110, 112, 114 ROTATION AXIS
120, 120a TEMPERATURE DETECTION UNIT
130 WEIGHT DETECTION UNIT
140 FOCAL POSITION ADJUSTMENT UNIT
150 POWDER SUPPLY TUBE
152 DISTRIBUTION UNIT
154 BRANCH TUBE
155a, 155b RANGE
156 MIXING UNIT
156a, 156b STIRRING PLATE
158 FLOW STRAIGHTENING DEVICE
A MOLTEN BODY
B SOLID BODY
L LASER BEAM
P POWDER

The invention claimed is:

1. A three-dimensional deposition device for forming a three-dimensional shape by depositing a formed layer on a base unit, comprising:
a powder supplier which supplies a powder material toward the base unit;
a light irradiator which irradiates the powder material supplied from the powder supplier toward the base unit with a light beam;
a powder introducer which includes a plurality of storages storing the powder material to be supplied to the powder supplier; and
a controller which controls operations of the powder supplier, the powder introducer, and the light irradiator so that the light beam is irradiated to the powder material, and the melted powder material is solidified on the base unit,
wherein the powder introducer includes:
a first storage storing a first powder material to be supplied to the powder supplier;
a second storage storing a second powder material to be supplied to the powder supplier;
a buffer which temporarily stores at least one of the first powder material supplied from the first storage and the second powder material supplied from the second storage;
a powder switcher which controls (i) whether the first powder material is supplied to the buffer from the first storage and (ii) whether the second powder material is supplied to the buffer from the second storage;
a distributer to which at least one of the first and second powder materials is supplied from the buffer through a powder supply tube;
a branch tube which includes a plurality of tubes and connects between the distributor and the powder supplier, to which at least one of the first and second powder materials is supplied from the distributor and from which at least one of the first and second powder materials is supplied to the powder supplier.

2. The three-dimensional deposition device according to claim 1,
wherein when the powder material introduced from the powder introducer to the powder supplier is switched from the first powder material to the second powder material, the controller instructs the powder introducer to:
form the formed layer by the first powder material,
thereafter start a supply of the second powder material to the powder supplier while supplying the first powder material to the powder supplier, and
thereafter change a supply ratio by increasing a supply amount of the second powder material to the powder supplier while decreasing a supply amount of the first powder material to the powder supplier.

3. The three-dimensional deposition device according to claim 1, further comprising:
a machining device which includes a tool and performs a machining operation on the formed layer by the tool.

4. The three-dimensional deposition device according to claim 1,
wherein the powder supplier is concentrically disposed on an outer periphery of the light irradiator so that a powder passage causing the powder material to flow therethrough is formed between an inner tube surrounding a path of the light beam of the light irradiator and an outer tube covering the inner tube.

5. The three-dimensional deposition device according to claim 4, further comprising:
a shield gas supplier which is disposed on an outer periphery of the powder supplier concentrically with the outer periphery of the light irradiator while surrounding an outer periphery of a powder material supplying area from outside the powder passage and supplying a shield gas toward the base unit.

6. The three-dimensional deposition device according to claim 1, further comprising:
a focal position adjuster which adjusts a focal position of the light beam emitted from the light irradiator.

7. The three-dimensional deposition device according to claim 6,
wherein the focal position adjuster is mechanism that moves a position of the light irradiator.

8. The three-dimensional deposition device according to claim 6,
wherein the focal position adjuster is a mechanism that moves a focal distance or a focal position by adjusting a light concentrating optical system of the light irradiator.

9. The three-dimensional deposition device according to claim 1, further comprising:
a temperature detector which detects and obtains a temperature of a surface of the formed layer,
wherein the controller controls intensity of the light beam output from the light irradiator based on a measurement result obtained by the temperature detector.

10. The three-dimensional deposition device according to claim 9,
wherein the controller specifies a temperature detection position based on at least one of the temperature of the surface of the formed layer obtained by the temperature detector and properties of the base unit and the formed layer.

11. The three-dimensional deposition device according to claim 1, further comprising:
a plasma emission detector which detects and obtains a plasma emission state of a surface of the formed layer,
wherein the controller controls the intensity of the light beam output from the light irradiator based on a measurement result obtained by the plasma emission detector.

12. The three-dimensional deposition device according to claim 1, further comprising:
a reflected light detector which detects and obtains a state of a reflected light from a surface of the formed layer,
wherein the controller controls the intensity of the light beam output from the light irradiator based on a measurement result obtained by the reflected light detector.

13. The three-dimensional deposition device according to claim 1, further comprising:
a mover which relatively moves a position of the light irradiator and the powder supplier with respect to a position of the base unit,
wherein the controller determines a path through which the position of the light irradiator and the powder supplier pass with respect to the position of the base unit by the mover.

14. The three-dimensional deposition device according to claim 13, further comprising:
a shape measurer which measures a surface shape of the formed layer,
wherein the controller controls operations of the powder supplier, the light irradiator, and the mover based on a measurement result obtained by the shape measurer.

15. The three-dimensional deposition device according to claim 1,
wherein the light irradiator is able to adjust a profile of the light beam.

16. The three-dimensional deposition device according to claim 1,
wherein the light irradiator is able to switch a mode of emitting the light beam in the form of pulse waves and a mode of emitting the light beam in the form of continuous waves.

17. The three-dimensional deposition device according to claim 1, further comprising:
a powder collector which collects the powder material supplied from the powder supplier and not melted by the light beam.

18. The three-dimensional deposition device according to claim 17, further comprising:
a separator which separates the powder material collected by the powder collector in accordance with the property of the powder material.

19. The three-dimensional deposition device according to claim 1, further comprising:
a powder identifier which identifies the powder material stored in at least one of the first and second storages and introduces the identified powder material into the powder supplier,
wherein the controller controls the introduction of the powder material from the powder introducer to the powder supplier based on an identification result of the powder identifier.

20. The three-dimensional deposition device according to claim 19,
wherein when the controller determines that the powder material stored in at least one of the first and second storages is not appropriate, the controller instructs to stop a supply of the powder material from the powder introducer to the powder supplier.

21. The three-dimensional deposition device according to claim 20,
wherein the controller transmits information indicating the powder material is inappropriate or information of an inappropriate powder material to an external data server.

22. The three-dimensional deposition device according to claim 19,
wherein when the controller determines that the powder material stores in at least one of the first and second storages is appropriate, the controller introduces the powder material from the powder introducer to the powder supplier and determines a formed layer forming condition based on the identification result of the powder identifier.

23. The three-dimensional deposition device according to claim 22,
wherein when the controller instructs the powder introducer to supply different types of powder material in a mixed state, the controller determines the formed layer forming condition based on a content of an instruction of supplying injecting different types of powder material in a mixed state.

24. The three-dimensional deposition device according to claim 22,
wherein the formed layer forming condition includes at least one of a shape of each formed layer, a type of powder material, a powder supplying speed, a powder supplying pressure, a laser beam irradiation condition, a temperature of a molten body, a solid body cooling temperature, and a base unit moving speed.

25. The three-dimensional deposition device according to claim 22, wherein the controller is connected to an external device via a communication line and is able to change the formed layer forming condition based on an instruction input from the external device.

26. The three-dimensional deposition device according to claim 1,
wherein the branch tube includes a mixer which stirs the powder material inside the plurality of tubes.

27. The three-dimensional deposition device according to claim 26,
wherein the mixer includes a mechanism that homogenize the powder material flowing through the plurality of tubes.

28. The three-dimensional deposition device according to claim 27,
wherein the mixer includes a stirring plate twisted about an axial direction of the branch tube along a flow direction of the branch tube.

29. The three-dimensional deposition device according to claim 26,
wherein the powder supplier includes a flow straightener which is disposed in a downstream of the mixer in view of a flow of the powder material and straightens the flow of the powder material supplied from the branch tube.

30. The three-dimensional deposition device according to claim 1,
wherein the stirring plate includes a first range and a second range, and
the stirring plate disposed in a first range and the stirring plate disposed in a second range are twisted in opposite directions.

31. The three-dimensional deposition device according to claim 1,
wherein the powder switcher includes a first valve disposed between the first storage and the buffer and a second valve disposed between the second storage and the buffer.

32. The three-dimensional deposition device according to claim 1,
wherein the powder introducer includes a carrying gas supplier which supplies a carrying gas for carrying the powder material temporarily stored in the buffer to the powder supply tube.

33. The three-dimensional deposition device according to claim 1,
wherein the powder introducer includes a third storage storing a third powder material to be supplied to the powder supplier and the buffer temporarily stores at least one of the first powder material supplied from the first storage, the second powder material supplied from the second storage, and the third powder material supplied from the third storage.

34. The three-dimensional deposition device according to claim 33,
wherein when the powder material introduced from the powder introducer to the powder supplier is switched from the first powder material to the second powder material, the controller instructs the powder introducer to:
form the formed layer by the first powder material,
thereafter form the formed layer by the third powder material which is an intermediate powder material having high affinity with both the first powder material and the second powder material, and
thereafter form the formed layer by the second powder material.

35. A three-dimensional deposition method of forming a three-dimensional object by depositing a formed layer on a base unit, comprising:
supplying, by a power supplier, a powder material towards the base unit;
irradiating, by a light irradiator, the supplied powder material with a light beam in a space between the base unit and the powder supplier to melt the powder material in the space,
dropping the melted powder material from the space to the base unit, solidifying the melted powder material on the base unit to form a formed layer on the base unit, and depositing the formed layer;
providing a powder introducer including, a plurality of storages storing the powder material to be supplied to the powder supplier; and
controlling operations of the powder supplier, the powder introducer, and the light irradiator so that the light beam is irradiated to the powder material, and the melted powder material is solidified on the base unit;
wherein the step of controlling an operation of the powder introducer includes,
storing, in a first storage, a first powder material to be supplied to the powder supplier,
storing, in a second storage, a second powder material to be supplied to the powder supplier,
temporarily storing, in a buffer, at least one of the stored first powder material and the stored second powder material,
controlling, by a powder switcher, (i) whether the first powder material is supplied to the buffer, and (ii) whether the second powder material is supplied to the buffer,
supplying, by a distributer, at least one of the first and second powder materials from the buffer through a powder supply tube, and
providing a branch tube including a plurality of tubes connecting between the distributer and the powder supplier, to which at least one of the first and second powder materials is supplied from the distributor and from which at least one of the first and second powder materials is supplied to the powder supplier.

36. The three-dimensional deposition method according to claim 35,
wherein a position of the formed layer is detected and a focal position of the light beam is adjusted in response to the position of the formed layer.

37. The three-dimensional deposition method according to claim 35,
wherein a temperature of a surface of the formed layer is detected and intensity of the output light beam is controlled based on a temperature measurement result of the surface of the formed layer.

38. The three-dimensional deposition method according to claim 35,
wherein a plasma emission state of the surface of the formed layer is detected and the intensity of the output light beam is controlled in response to a plasma emission measurement result of the formed layer.

39. The three-dimensional deposition method according to claim 35,
wherein reflected light of the surface of the formed layer is detected and the intensity of the output light beam is controlled in response to a reflected light measurement result of the formed layer.

40. The three-dimensional deposition method according to claim 35, wherein a mode of emitting the light beam in the form of pulse waves and a mode of emitting the light beam in the form of continuous waves are switched in response to the formed layer to be formed.

* * * * *